US012739591B2

(12) United States Patent
Kaetel

(10) Patent No.: US 12,739,591 B2
(45) Date of Patent: Sep. 15, 2026

(54) APPARATUS AND METHOD FOR GENERATING CONTROL SIGNALS FOR A LOUDSPEAKER SYSTEM WITH SPECTRAL INTERLACING IN THE LOWER FREQUENCY RANGE

(71) Applicant: Kaetel Systems GmbH, Munich (DE)

(72) Inventor: Klaus Kaetel, Munich (DE)

(73) Assignee: KAETEL SYSTEMS GMBH, Munich (DE)

( * ) Notice: Subject to any disclaimer, the term of this patent is extended or adjusted under 35 U.S.C. 154(b) by 116 days.

(21) Appl. No.: 18/615,161

(22) Filed: Mar. 25, 2024

(65) Prior Publication Data

US 2024/0236612 A1 Jul. 11, 2024

Related U.S. Application Data

(63) Continuation of application No. PCT/EP2022/077207, filed on Sep. 29, 2022.

(30) Foreign Application Priority Data

Sep. 30, 2021 (DE) ..................... 10 2021 211 051.7
May 13, 2022 (EP) ..................................... 22173339

(51) Int. Cl.
*H04S 7/00* (2006.01)
*H04R 1/02* (2006.01)
(Continued)

(52) U.S. Cl.
CPC ............. *H04S 7/307* (2013.01); *H04R 1/025* (2013.01); *H04R 1/24* (2013.01); *H04R 3/14* (2013.01);
(Continued)

(58) Field of Classification Search
CPC . H04S 7/00; H04S 7/307; H04S 7/301; H04S 3/008; H04S 3/00; H04S 3/004;
(Continued)

(56) References Cited

U.S. PATENT DOCUMENTS 4,329,544 A * 5/1982 Yamada .................. H04S 1/002 381/1
4,748,669 A * 5/1988 Klayman .................. H04S 7/30 381/103
(Continued)

FOREIGN PATENT DOCUMENTS

CN 106961647 A 7/2017
CN 107852563 A 3/2018
(Continued)

OTHER PUBLICATIONS

International Search Report and Written Opinion dated Jan. 2, 2023, issued in application No. PCT/EP2022/077207.
(Continued)

*Primary Examiner* — Leshui Zhang
(74) *Attorney, Agent, or Firm* — McClure, Qualey & Rodack, LLP

(57) ABSTRACT

An apparatus for generating control signals for a loudspeaker system with two sound generators including a first input for a first channel signal of a multi-channel audio signal; a second input for a second channel signal of the multi-channel audio signal; a first output for a first control signal for a first sound generator; a second output for a second control signal for a second sound generator; a base differential mode signal generator for forming a base differential mode signal from the first channel signal and the second channel signal at the second input; a differential mode signal generator for generating a first differential mode signal and a second differential mode signal from the base differential mode signal, wherein the first differential mode
(Continued)

signal is phase-shifted with respect to the second differential mode signal; and a mixer for mixing a common mode signal with the first differential mode signal.

35 Claims, 18 Drawing Sheets

(51) Int. Cl.
*H04R 1/24* (2006.01)
*H04R 3/14* (2006.01)
*H04R 5/02* (2006.01)
*H04R 5/04* (2006.01)
*H04S 3/00* (2006.01)

(52) U.S. Cl.
CPC ................. *H04R 5/02* (2013.01); *H04R 5/04* (2013.01); *H04S 3/008* (2013.01); *H04R 2420/01* (2013.01); *H04R 2499/13* (2013.01); *H04S 2400/01* (2013.01)

(58) Field of Classification Search
CPC ........ H04S 2400/01; H04S 5/00; H04S 5/005; H04S 1/002; H04S 1/005; H04R 1/025; H04R 1/24; H04R 1/02; H04R 3/04; H04R 3/12; H04R 3/14; H04R 5/02; H04R 5/04; H04R 2420/01; H04R 2499/13; H04R 2400/01; H04R 2430/01; H04R 27/00; H04R 27/30; H04R 2201/021; H04R 2410/03
USPC ... 381/303, 302, 301, 300, 307, 308, 61, 63, 381/77, 80, 82, 85, 98–103, 104, 111, 381/116, 117, 118, 119, 120; 700/94
See application file for complete search history.

(56) References Cited

U.S. PATENT DOCUMENTS 4,812,921 A 3/1989 Mitsuhashi
5,524,053 A * 6/1996 Iwamatsu ............... H04S 7/305 381/63
5,970,153 A * 10/1999 Petroff ..................... H04R 5/04 381/28
6,801,631 B1 10/2004 North
9,197,963 B1 11/2015 North
10,952,005 B1 3/2021 McGrael
11,223,886 B1 1/2022 Fadul
2003/0076964 A1 4/2003 Stickles
2004/0005066 A1* 1/2004 Kraemer ................... H04S 5/00 381/17
2005/0129258 A1 6/2005 Fincham
2005/0135639 A1* 6/2005 Levy ........................ H04R 3/00 381/98
2006/0215866 A1 9/2006 Francisco
2008/0035417 A1 2/2008 Combest
2008/0279412 A1 11/2008 Bertoli
2009/0304213 A1* 12/2009 Cook ...................... H04S 1/002 381/300
2010/0246880 A1 9/2010 Oxford
2010/0272295 A1 10/2010 Nakatani
2012/0008812 A1 1/2012 Sporer
2013/0163783 A1* 6/2013 Burlingame ........... H03G 5/165 381/103
2013/0287228 A1 10/2013 Kallai
2014/0161271 A1* 6/2014 Teranishi ................. H04R 5/04 381/71.7
2015/0237446 A1* 8/2015 Katayama ................ H04R 3/12 381/163
2016/0073195 A1 3/2016 Adamson
2016/0088393 A1 3/2016 Miyasaka et al.
2017/0353812 A1* 12/2017 Schaefer ................. H04S 3/008
2018/0192229 A1 7/2018 Easley
2018/0302737 A1 10/2018 Laitinen
2020/0189436 A1 6/2020 Soltner
2020/0221243 A1* 7/2020 Schaefer ................. H04S 3/008
2020/0228910 A1* 7/2020 Mariglio, III ............. H04S 3/02
2021/0306788 A1 9/2021 Kim
2023/0362532 A1 11/2023 Kaetel
2024/0040303 A1 2/2024 Kaetel

FOREIGN PATENT DOCUMENTS

CN 111775861 A 10/2020
DE 10 2021 200 552 A1 7/2022
DE 10 2021 203 640 A1 10/2022
EP 1 280 377 A1 1/2003
EP 2 692 144 B1 2/2017
EP 2 692 154 B1 9/2017
EP 2 692 151 B1 1/2018
EP 3 061 262 B1 1/2018
EP 3 061 266 B1 9/2020
JP H07-131883 A 5/1995
JP 2897586 B2 * 5/1999 ............ H04S 7/305
JP 2004-135023 A 4/2004
JP 2008-193394 A 8/2008
TW 201916694 A 4/2019
WO 87/06090 A1 10/1987
WO 2009/071911 A2 6/2009
WO 2010/105280 A1 9/2010
WO 2012/172394 A1 12/2012

OTHER PUBLICATIONS

English language translation of International Search Report dated Jan. 2, 2023.
Non-Final Office Action dated Mar. 11, 2026, issued in U.S. Appl. No. 18/402,911.
Non-Final Office Action dated May 27, 2026, issued in U.S. Appl. No. 18/615,148.
Notice of Allowance dated 2026-07-01, issued in U.S. Appl. No. 18/402,911.

* cited by examiner configurations for loudspeaker installation in instrument panel/hat rack, etc.

APPARATUS AND METHOD FOR GENERATING CONTROL SIGNALS FOR A LOUDSPEAKER SYSTEM WITH SPECTRAL INTERLACING IN THE LOWER FREQUENCY RANGE

CROSS-REFERENCES TO RELATED APPLICATIONS

This application is a continuation of copending International Application No. PCT/EP2022/077207, filed Sep. 29, 2022, which is incorporated herein by reference in its entirety, and additionally claims priority from German Application No. DE 10 2021 211 051.7, filed Sep. 30, 2021, and European Application EP 22 173 339.7, filed May 13, 2022, all of which are incorporated herein by reference in its entirety.

BACKGROUND OF THE INVENTION

The present invention concerns electroacoustic and in particular concepts for generating and reproducing audio signals in a space, such as in a vehicle or a stationary space, such as a hall, a waiting area, etc.

Typically, acoustic scenes are recorded using a set of microphones. Each microphone outputs a microphone signal. For example, 25 microphones may be used for an audio scene of an orchestra. A sound engineer then mixes the 25 microphone output signals, e.g., into a standard format such as a stereo format, a 5.1 format, a 7.1 format, a 7.2 format, or any other corresponding format. In case of a stereo format, e.g., the sound engineer or an automatic mixing process generates two stereo channels. In the case of a 5.1 format, mixing results in five channels and one subwoofer channel. Analogously, in case of a 7.2 format, e.g., mixing results in seven channels and two subwoofer channels. If the audio scene is to be rendered in a reproduction environment, a mixing result is applied to electrodynamic loudspeakers. In a stereo reproduction scenario, there are two loudspeakers, the first loudspeaker receiving the first stereo channel and the second loudspeaker receiving the second stereo channel. For example, in a 7.2 reproduction format, there are seven loudspeakers at predetermined positions, and two subwoofers, which can be placed relatively arbitrarily. The seven channels are applied to the corresponding loudspeakers, and the subwoofer channels are applied to the corresponding subwoofers.

The use of a single microphone arrangement when capturing audio signals, and the use of a single loudspeaker arrangement when reproducing the audio signals typically neglects the true nature of the sound sources. European patent EP 2692154 B1 describes a set for capturing and reproducing an audio scene, in which not only the translation but also the rotation and, in addition, the vibration is captured and reproduced. Thus, a sound scene is not only reproduced by a single capturing signal or a single mixed signal but by two capturing signals or two mixed signals that, on the one hand, are recorded simultaneously, and that, on the other hand, are reproduced simultaneously. This ensures that different emission characteristics of the audio scene are recorded compared to a standard recording, and are reproduced in a reproduction environment.

To this end, as is illustrated in the European patent, a set of microphones is placed between the acoustic scene and a (imaginary) listener space to capture the "conventional" or translation signal that is characterized by a high directionality, or high quality.

In addition, a second set of microphones is placed above or to the side of the acoustic scene to record a signal with lower quality, or lower directionality, that is intended to represent the rotation of the sound sources in contrast to the translation.

On the reproduction side, corresponding loudspeakers are placed at the typical standard positions, each of which has a omnidirectional arrangement to reproduce the rotation signal, and a directional arrangement to reproduce the "conventional" translational sound signal. In addition, there is a subwoofer at each of the standard positions, or there is only a single subwoofer at an arbitrary location.

European patent EP 2692144 B1 discloses a loudspeaker for reproducing, on the one hand, the translational audio signal and, on the other hand, the rotatory audio signal. Thus, the loudspeaker has, on the one hand, an arrangement that emits in an omnidirectional manner, and, on the other hand, an arrangement that emits in a directional manner.

European patent EP 2692151 B1 discloses an electret microphone that can be used for recording the omnidirectional or the directional signal.

European patent EP 3061262 B1 discloses earphones and a method for manufacturing earphones that generate both a translational sound field and a rotatory sound field.

European patent EP 3061266 B1 discloses earphones and a method for producing earphones configured to generate the "conventional" translational sound signal by using a first transducer, and to generate the rotatory sound field by using a second transducer arranged perpendicular to the first transducer.

Recording and reproducing the rotatory sound field in addition to the translational sound field leads to a significantly improved and therefore high-quality audio signal perception that almost conveys the impression of a live concert, even though the audio signal is reproduced by the loudspeaker or headphones or earphones.

This achieves a sound experience that can almost not be distinguished from the original sound scene in which the sound is not emitted by loudspeakers but by musical instruments or human voices. This is achieved by considering that the sound is emitted not only translationally but also in a rotary manner and possibly also in a vibrational manner, and is therefore to be recorded and reproduced accordingly.

A disadvantage of the concept described is that recording the additional signal that reproduces the rotation of the sound field represents a further effort. In addition, there are many pieces of music, for example classical pieces or pop pieces, where only the conventional translational sound field has been recorded. Typically, the data rate of these pieces is heavily compressed, e.g., according to the MP3 standard or the MP4 standard, contributing to an additional deterioration of quality, however, which is typically only audible for experienced listeners. On the other hand, there are almost no audio pieces that have not been recorded at least in the stereo format, i.e. with a left channel and a right channel. Rather, the development goes towards generating more channels than only a left and a right channel, i.e. generating surround recordings with five channels or even recordings with higher formats, for example, which is known under the keyword MPEG surround or Dolby Digital in the technology.

Thus, there are many pieces that have been recorded at least in the stereo format, i.e. with a first channel for the left side and a second channel for the right side. There are even more and more pieces where recording has been done with more than two channels, e.g., for a format with several channels on the left side and several channels on the right side and one channel in the center. Even higher level formats use more than five channels in the horizontal plane and in addition also channels from above or channels from obliquely above and possibly also, if possible, channels from below.

However, these formats all have in common that they only reproduce the conventional translatory sound by applying the individual channels to corresponding loudspeakers with corresponding transducers.

SUMMARY

An embodiment may have an apparatus for generating control signals for a loudspeaker system with two sound generators, comprising: a first input for a first channel signal of a multi-channel audio signal; a second input for a second channel signal of the multi-channel audio signal; a first output for a first control signal for a first sound generator; a second output for a second control signal for a second sound generator; a base differential mode signal generator for forming a base differential mode signal from the first channel signal and the second channel signal at the second input; a differential mode signal generator for generating a first differential mode signal and a second differential mode signal from the base differential mode signal, wherein the first differential mode signal is phase-shifted with respect to the second differential mode signal; and a mixer for mixing a common mode signal with the first differential mode signal so as to acquire the first control signal, and for mixing the common mode signal with the second differential mode signal so as to acquire the second control signal, wherein the differential mode signal generator comprises: a frequency filter for generating one or several low-pass signals from one input signal or several input signals in the frequency filter; and spectral interlacer for spectrally filtering the one low-pass signal or a first low-pass signal of the several low-pass signals in a first manner so as to acquire a first filtered signal, and the one low-pass signal or a second low-pass signal of the several low-pass signals in a second manner so as to acquire the second filtered signal that differs from the first filtered signal, wherein the differential mode signal generator is configured to use the first filtered signal as the first differential mode signal or to derive the first differential mode signal from the first filtered signal, or to use the second filtered signal as the second differential mode signal or to derive the second differential mode signal from the second filtered signal.

Another embodiment may have a method for generating control signals to a loudspeaker system with two sound generators, comprising: receiving a first channel signal of a multi-channel audio signal and a second channel signal of a multi-channel audio signal; outputting a first control signal for the first sound generator, and a second control signal for the second sound generator; forming a base differential mode signal from the first channel signal and the second channel signal; generating a first differential mode signal and a second differential mode signal from the base differential mode signal, wherein the first differential mode signal is phase-shifted with respect to the second differential mode signal; and mixing a common mode signal with the first differential mode signal so as to acquire the first control signal, and for mixing the common mode signal with the second differential mode signal so as to acquire the second control signal, wherein generating comprises: generating one or several low-pass signals from one input signal or several input signals in the frequency filter; and spectrally filtering the one low-pass signal or a first low-pass signal of the several low-pass signals in a first manner so as to acquire a first filtered signal, and the one low-pass signal or a second low-pass signal of the several low-pass signals in a second manner so as to acquire the second filtered signal that differs from the first filtered signal, wherein the first filtered signal is used as the first differential mode signal or the first differential mode signal is derived from the first filtered signal, and wherein the second filtered signal is used as the second differential mode signal or the second differential mode signal is derived from the second filtered signal.

Another embodiment may have a non-transitory digital storage medium having a computer program stored thereon to perform the method for generating control signals to a loudspeaker system with two sound generators, comprising: receiving a first channel signal of a multi-channel audio signal and a second channel signal of a multi-channel audio signal; outputting a first control signal for the first sound generator, and a second control signal for the second sound generator; forming a base differential mode signal from the first channel signal and the second channel signal; generating a first differential mode signal and a second differential mode signal from the base differential mode signal, wherein the first differential mode signal is phase-shifted with respect to the second differential mode signal; and mixing a common mode signal with the first differential mode signal so as to acquire the first control signal, and for mixing the common mode signal with the second differential mode signal so as to acquire the second control signal, wherein generating comprises: generating one or several low-pass signals from one input signal or several input signals in the frequency filter; and spectrally filtering the one low-pass signal or a first low-pass signal of the several low-pass signals in a first manner so as to acquire a first filtered signal, and the one low-pass signal or a second low-pass signal of the several low-pass signals in a second manner so as to acquire the second filtered signal that differs from the first filtered signal, wherein the first filtered signal is used as the first differential mode signal or the first differential mode signal is derived from the first filtered signal, and wherein the second filtered signal is used as the second differential mode signal or the second differential mode signal is derived from the second filtered signal, when said computer program is run by a computer.

An inventive apparatus for generating control signals for a loudspeaker system with two sound generators includes: a first input for a first channel signal of a multi-channel audio signal; a second input for a second channel signal of the multi-channel audio signal; a first output for a first control signal for a first sound generator; a second output for a second control signal for a second sound generator; a base differential mode signal generator for forming a base differential mode signal of the first channel signal at the first input and of the second channel signal at the second input; a differential mode signal generator for generating a first differential mode signal and a second differential mode signal from the base differential mode signal, wherein the first differential mode signal is phase-shifted with respect to the second differential mode signal; and a mixer for mixing a common mode signal with the first differential mode signal so as to obtain the first control signal, and for mixing the common mode signal with the second differential mode signal so as to obtain the second control signal, wherein the differential mode signal generator comprises: a frequency filter for generating one or several low-pass signals from an input signal or several input signals in the frequency filter; and spectral interlacing means (or spectral interlacer, or spectral processor) for spectrally filtering the one low-pass signal or a first low-pass signal of the several low-pass signals in a first manner so as to obtain a first filtered signal, and the one low-pass signal or a second low-pass signal of the several low-pass signals in a second manner so as to obtain a second filtered signal that differs from the first filtered signal, wherein the differential mode signal generator is configured to use the first filtered signal as the first differential mode signal or to derive the first differential mode signal from the first filtered signal, and to use the second filtered signal as the second differential mode signal or to derive the second differential mode signal from the second filtered signal.

Advantageously, the lowest spectral range is supplied to the spectral interlacing means. This range is also referred to as low-pass signal. The center spectral range, advantageously adjacent to the lowest range, is not subjected to spectral interlacing. Instead, this range, which is contained in a signal referred to as high-pass signal, is used directly without interlacing filtering so as to generate the differential mode signals. The high spectral range is advantageously also not subjected to spectral interlacing processing, but may be used directly for the utilization of the differential mode signal. Alternative, however, only a common mode signal is emitted in the upper range, so that one tweeter suffices here. Alternative, however, two tweeters with a differential mode signal control may be provided.

According to the invention, only the low-pass range of the base differential mode signal (prior to the phase shift) or of two phase-shifted base differential mode signals is subjected to spectral interlacing, whereas the higher frequency range of the control signal for the midrange speakers or woofers is not subjected to spectral interlacing, but is directly guided to the sound generators so as to here generate a non-spectrally filtered differential mode signal. Spectral interlacing in the low frequency range ensures that the two differential mode signals do not cancel each other out in the air even though they are phase-shifted. This could happen if the size of the sound transducers of the midrange speakers or woofers, or their distance, is not large enough. Since there are construction boundaries in this regard, it is advantageous to perform corresponding spectral interlacing of the first differential mode signal with respect to the second differential mode signal in the low-pass range obtained by the frequency filter. In contrast, it has been found that such spectral interlacing in the treble range of the base differential mode signal should not be carried out, since the construction conditions of the two midrange speakers or woofers and the geometrical arrangement and the geometrical distance are sufficient so that the differential mode propagates in the air excited by the loudspeaker system.

The apparatus for generating control signals includes a base differential mode signal generator, possibly a common mode signal generator, a differential mode signal generator, a mixer, and possibly a tweeter signal generator so as to determine two or three control signals, respectively.

The common mode signal generator and the tweeter signal generator advantageously include a frequency filter to generate from the original signal a low-pass signal that is required for the common mode signal generation, and to further generate a high-pass signal required for the tweeter signal generator. Furthermore, in advantageous embodiments, the differential mode signal generator includes a further frequency filter to generate a high-pass signal and a low-pass signal, wherein the high-pass signal is not further filtered spectrally in the differential mode signal generator. On the other hand, the low-pass signal is provided to spectral interlacing means so as to achieve spectral interlacing to the effect that the low, or bass, portions emitted by the two midrange speakers or woofers do not cancel each other out. Thus, spectral interlacing in the two control signals with respect to each other is achieved through the spectral interlacing means, however, limited to the base range, since the high-pass range of the control signal is ideally radiated for the midrange speakers or woofers, or the sound generator in general, due to the geometry of the midrange speakers or woofers, and, therefore, no cancellation is to be expected in the sound transfer medium.

Advantageously, the signal for the tweeter is not processed with respect to the a differential mode signal processing. Instead, the signal radiated by the tweeter will be purely a common mode signal, however, according to the implementation, which will be supplemented by an accordingly amplified or attenuated differential signal portion. However, since there is only one tweeter, only one common mode signal will be excited in the sound propagation medium. On the other hand, due to the inventive control, the two midrange speakers or woofers simultaneously excite the common mode and the push/pull mode, or differential mode, in the sound transfer medium, leading to the excellent perceived sound quality in the space to be acoustically irradiated.

According to the embodiment, the inventive apparatus further includes an interface for transmitting the control signals. The interface may be configured in a wired or a wireless manner and, according to the implementation, it may already include power amplifiers or not.

In addition, according to the implementation, the interface may perform further measures for the control signals, such as equalizer processing of the signals or source coding of the signals or source coding and transmitter processing of the signals so as to transmit the signals, e.g. wirelessly by means of a wireless protocol such as Bluetooth or DECT, to an input interface of a loudspeaker module typically also comprising power amplifiers.

Embodiments are based on the finding that, by generating a first and a second differential signal both derived from the first channel signal, from the second channel signal, or from both channel signals, a differential wave field may be generated around the two midrange speakers or woofers and therefore for a person acoustically irradiated by the loudspeakers, said differential wave field representing, in addition to the translational sound output by the loudspeakers, also the rotatory sound leading to a significant quality improvement of the subjective audio perception. In particular, separate loudspeakers are not required for the generation of the differential sound field, but the differential sound field is generated by accordingly applying, to the control signals for the loudspeakers, signals that have a phase difference with respect to each other, wherein this phase difference is advantageously 180°, however, it may be in the range 160° and 200°, which almost obtains the same effect as if the signals have the advantageously best phase shift of 180°.

The closer the first and the second midrange speakers or woofers are arranged with respect to each other, the better the effect of the differential wave field. The loudspeakers should be spaced apart from each other advantageously at least 10 cm and at most 1 m, wherein distances are advantageous in the range of 20 cm (e.g. 15 to 30 cm). The relatively close spatial arrangement of the two loudspeakers particularly achieves that no separate sound generators are required for the generation of the differential wave field. Instead, it is sufficient that the two midrange speakers or woofers obtain the special inventive control signals.

Only one channel signal, i.e. either the left channel signal or the right channel signal, may be used to generate the control signal. Alternatively, a sum of the two channel signals, i.e. a mono signal, may be used. Alternatively and advantageously, the calculation of the base differential mode signal is based on taking between the two channel signals a difference which the base differential mode signal or the differential mode signals or mixed signals dominates. According to the implementation, this difference may be used directly, or it or may be combined with a sum signal, or it may be combined with the left channel signal or the right channel signal. However, it is advantageous to either use the differential signal alone for calculating the base differential mode signal or the mixed signals, or to use the differential signal in combination with the sum signal of the two channels, wherein the proportion of the differential signal and the proportion of the sum signals in the final differential mode signals or mixed signals is adjustable, and is advantageously set such that the differential signal determines at least ⅔ of the two differential mode signals or mixed signals with respect to the corresponding energy in the signals.

The loudspeakers are advantageously installed in a space such as an interior space in a vehicle, e.g. a land vehicle (car, train, sled, motor vehicle, . . . ), an air vehicle ("passenger" aircraft, helicopters, zeppelin, etc.), a water vehicle (boat, ferry, yacht, sailboard, etc.) or a space craft.

The two sound generators, such as the midrange speakers or woofers, generate differential soundwave fields. They may be generated via an oscillating surface (planar transducer) nor via two neighboring piston converters (loudspeakers) oscillating in the differential mode, or via other described transducers. Mono signals and/or differential signals (L-R or R-L) may serve as source signals for the generation of the differential soundwave field.

A synthetic generation of the rotation signal is possible if there is an audio piece with more than one channel, i.e. already having two, e.g. stereo, channels or even more channels. According to the invention, calculating an at least approximate difference obtains at least an approximation with respect to the differential signal, or rotation signal, which may then be used to drive the respective loudspeakers together with the respective channel signal. To this end, a calculation of two mix signals having a phase difference with respect to each other is performed.

In a further embodiment, in which there are more than two channels, e.g. in case of a 5.1 signal, a down mixer for the first channel signal, e.g., i.e. for the left channel, and a further down mixer for the second channel signal (i.e. for the right channel) are connected upstream of the control signal generator. However, if the signal is available as an original microphone signal, such as an ambisonics signal with several components, each down mixer is configured to accordingly calculate, from the ambisonics signal, a left channel or a right channel which is then used by the control signal generator to calculate the control signals.

According to a first aspect of the present invention, the loudspeakers are arranged separately from the apparatus for generating control signals. In such an embodiment, the loudspeakers have signal inputs that may be wired or wireless, wherein a signal for a sound generator in the loudspeaker is generated at each signal input. The control signal generator providing the control signals for the sound generator is arranged away from the actual loudspeaker and is connected to the loudspeakers via a communication link such as a wired connection or a wireless connection.

In another embodiment, the control signal generator is integrated into the loudspeakers or into a loudspeaker or into the vehicle. In such a case, in the loudspeaker with an integrated signal processor, the common mode signal is derived, and, depending on the implementation and the embodiment, the differential mode signal is derived separately, or is derived from the common mode signal. An aspect of the present invention therefore concerns the loudspeaker without a signal processor. Another aspect of the present invention therefore concerns the signal processor without a loudspeaker, and a further aspect of the present invention concerns the loudspeaker with an integrated signal processor.

BRIEF DESCRIPTION OF THE DRAWINGS

Embodiments of the present invention will be detailed subsequently referring to the appended drawings, in which.

DETAILED DESCRIPTION OF THE INVENTION

Figure 1A:
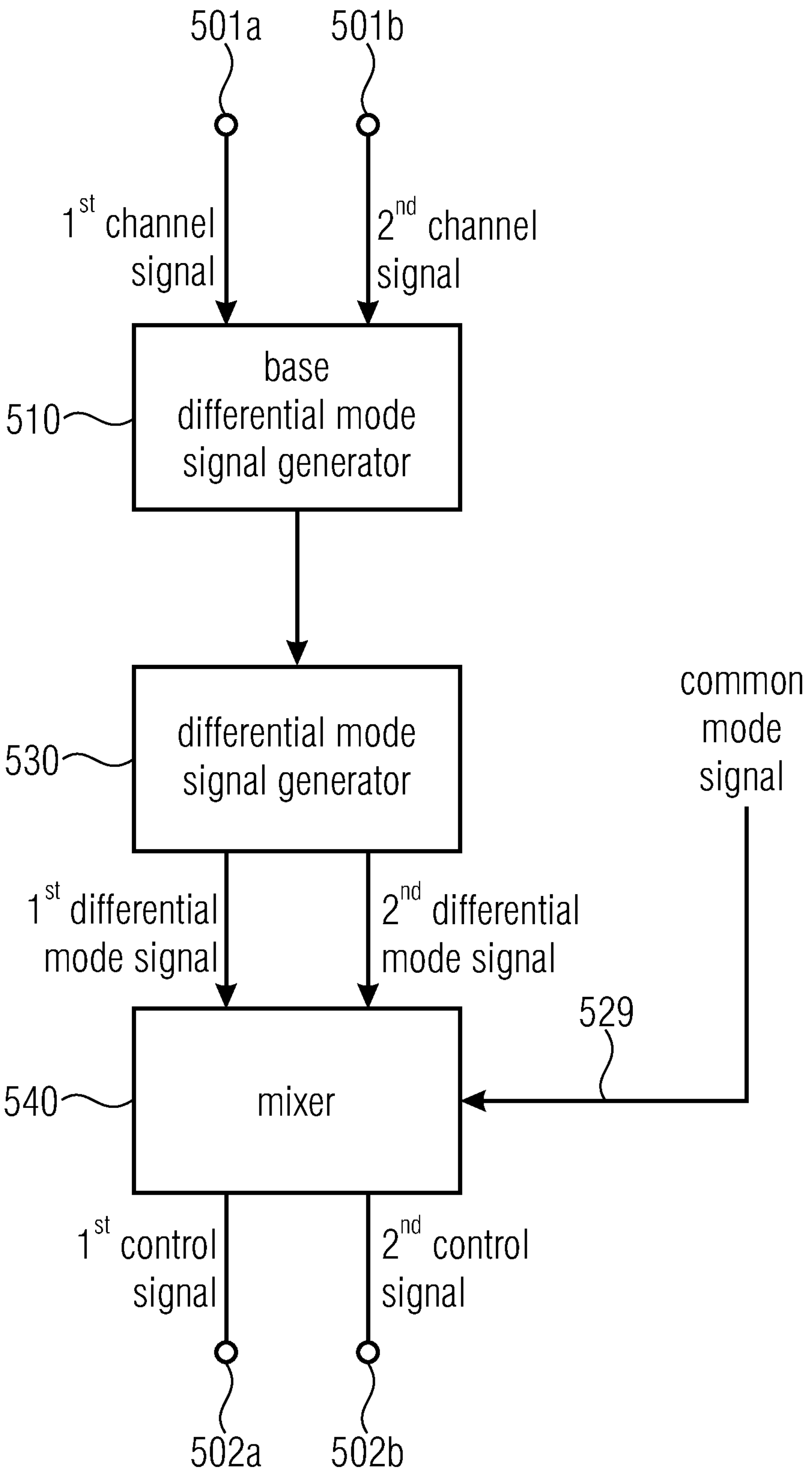
FIG. 1*a* shows a schematic illustration of the inventive apparatus for generating control signals.

FIG. 1*a* shows a schematic illustration of the inventive apparatus for generating control signals. The apparatus for generating control signals for a loudspeaker system with two sound generators includes a first input 501*a* for a first channel signal of a multi-channel audio signal, a second input 501*b* for a second channel signal of the multi-channel audio signal, a first output 502*a* for a first control signal for a first sound generator, a second output 502*b* for a second control signal for a second sound generator, a base differential mode signal generator 510 for forming a base differential mode signal of the first channel signal at the first input 501*a* and of the second channel signal at the second input 501*b*, a differential mode signal generator 530 for generating a first differential mode signal and a second differential mode signal from the base differential mode signal, wherein the first differential mode signal is phase-shifted with respect to the second differential mode signal, and a mixer 540 for mixing a common mode signal with the first differential mode signal so as to obtain the first control signal, and for mixing the common mode signal with the second differential mode signal so as to obtain the second control signal.

Figure 1B:
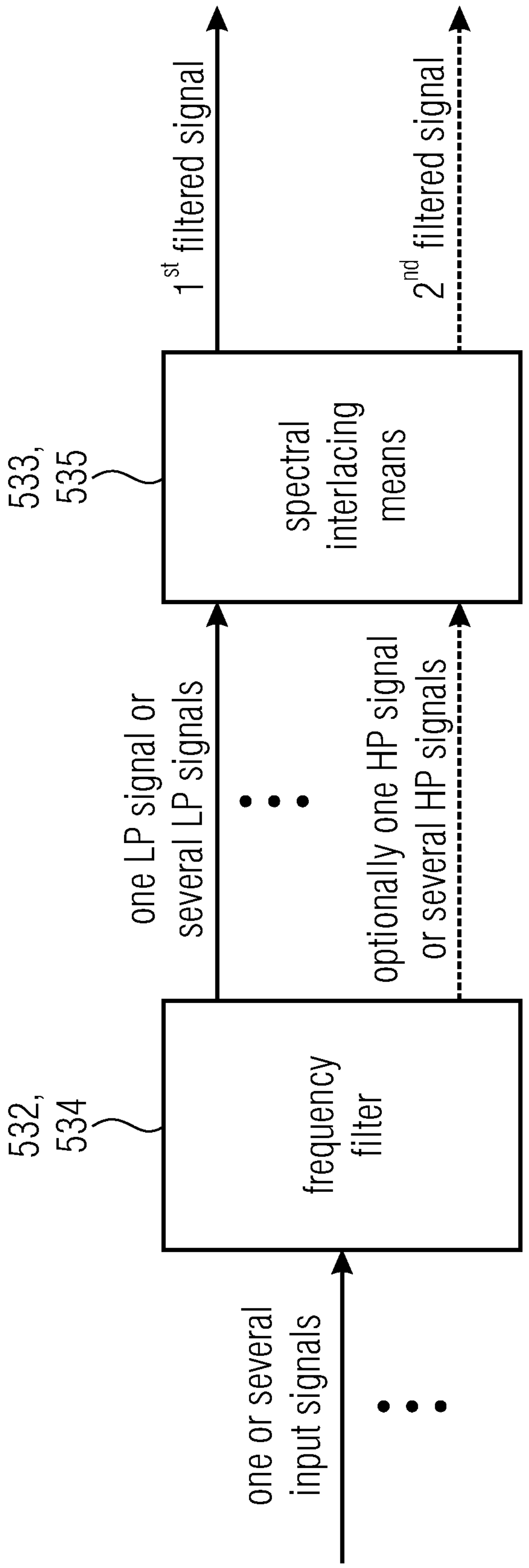
FIG. 1*b* shows a schematic illustration of the embodiment of the differential mode signal generator of FIG. 1*a;*

FIG. 1*b* shows a schematic illustration of the embodiment of the differential mode signal generator of FIG. 1*a*. The same includes a frequency filter 532, 535 for generating one or several low-pass signals from one input signal or several input signals in the frequency filter 532, and spectral interlacing means 533, 535 for spectrally filtering the one low-pass signal or a first low-pass signal of the several low-pass signals in a first manner so as to obtain a first filtered signal, and the one low-pass signal or a second low-pass signal of the several low-pass signals in a second manner so as to obtain a second filtered signal that differs from the first filtered signal, wherein the differential mode signal generator 530 is configured to use the first filtered signal as the first differential mode signal or to derive the first differential mode signal from the first filtered signal, and to use the second filtered signal as the second differential mode signal or to derive the second differential mode signal from the second filtered signal.

A number of further embodiments are illustrated with reference to FIGS. 6, 8*a*, 8*b* and 9 to 13. In general, in these embodiments of the present invention, only the low-pass signal is subjected to spectral interlacing processing in the elements 533, 53. The high-pass signal does not necessarily have to be generated. If it is not generated, the differential mode signals do not contain the spectral range of the high-pass signal or they obtain this spectral range in another way, e.g. by addition with the possibly filtered corresponding original signal. Advantageously, however, the high-pass signal is again combined with the spectrally filtered signal(s) separately or already in the mixer so that the differential mode signal comprises the full available bandwidth, or the bandwidth available up to the midrange.

Figure 8A:
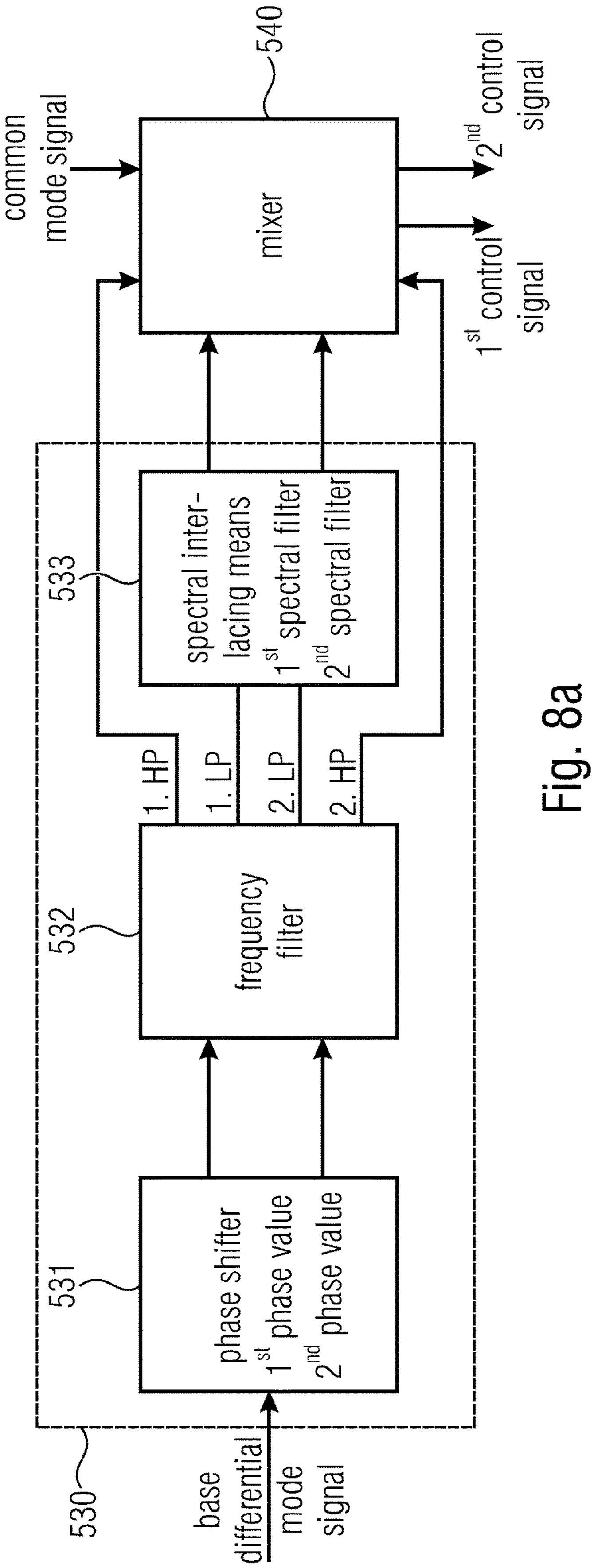
FIG. 8*a* shows a advantageous implementation of the differential mode signal generator with phase shifters at the input of the differential mode signal generator.
Figure 8B:
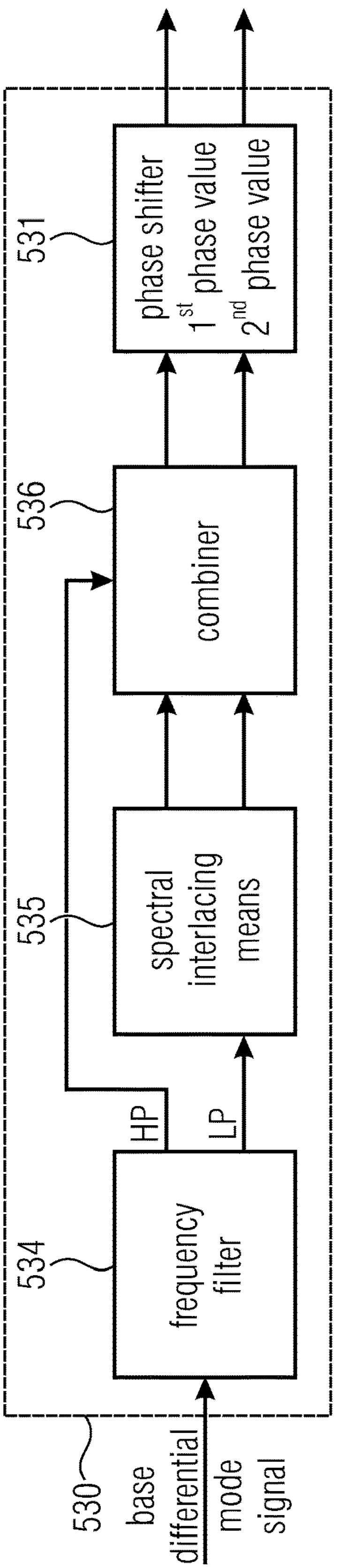
FIG. 8*b* shows an alternative advantageous implementation of the differential mode signal generator with phase shifters at the output of the differential mode signal generator.

According to the embodiment, the spectral interlacing means may only obtain a low-pass signal and generate therefrom both spectrally filtered signals, as it is exemplarily illustrated in FIG. 8*b*. It also illustrates the case of only one high-pass signal. Alternatively, the spectral interlacing means may obtain two or more low-pass signals and may generate, as is shown in FIG. 8*a*, both spectrally filtered signals from these two separately obtained low-pass signals. FIG. 8*a* also shows the case of the utilization of two or more high-pass signals.

A loudspeaker system includes at least two sound generators that may be arranged in spatial proximity. A advantageous loudspeaker system includes two midrange speakers or woofers that can be controlled separately and that essentially comprise equally sized membranes, as well as a tweeter. The two midrange speakers or woofers as well as the tweeter are accommodated in a loudspeaker housing, wherein the tweeter, same as the midrange speakers or woofers, is arranged in the loudspeaker housing and is mounted between the two midrange speakers or woofers.

This loudspeaker system, or loudspeaker module, is particularly suitable for an instrument panel or a rear shelf, or for a corresponding area in a vehicle, however, it may also be used to acoustically irradiate stationary spaces. In particular, the two midrange speakers or woofers are configured to provide an acoustic irradiation in a vehicle, or in a space to be acoustically irradiated, not only with the common-mode signal, i.e. the conventional audio channel, which may be a left channel, a right channel, a left rear channel, a right rear channel, or a center channel. Instead, in addition to the common mode (CM), the two midrange speakers or woofers also provide a push/pull mode, or differential mode (DM). According to the invention, this achieves a special sound experience, since the loudspeaker module does not only generate the common mode but also the differential mode and therefore does not only excite translational sound but also rotatory sound in the air. The tweeter is arranged between the two loudspeakers so as to provide efficient space utilization of the loudspeaker system housing and, on the other hand, so as to also achieve an optimum spatial source for the sound that is excited by the tweeter to the effect that the tweeter sound is excited close to the common mode or the differential mode of the two midrange speakers or woofers.

Advantageously, the loudspeaker module is a flat module, in particular for installation in an instrument panel or a rear shelf or any other corresponding position in a vehicle, wherein the top side of the loudspeaker housing has a length or width that is at least twice as large as the height of the loudspeaker system housing. Furthermore, in advantageous embodiments, the tweeter and the two midrange speakers or woofers each include a membrane that is essentially deflectable perpendicular to a top side of a loudspeaker system housing. In an alternative embodiment in the form of a shelf loudspeaker, the two midrange speakers or woofers and the tweeter are also arranged, however, in a housing that advantageously stands upright. The two membranes of the midrange speakers or woofers are arranged such that they are parallel and excite the sound in the same direction, i.e. perpendicular to a membrane surface. In addition, the tweeter is again advantageously arranged between the first and the second membrane, however, it is now deflectable essentially perpendicular to the two membranes so that, if the three loudspeakers are operated simultaneously, the membranes of the tweeter vibrates essentially perpendicular to the membranes of the two midrange speakers or woofers.

In advantageous embodiments, the loudspeaker modules for the instrument panel or the rear shelf are arranged at different positions, such as on the left, in the center, or on the right, wherein, depending on the implementation, there are different combinations with simple loudspeakers that irradiate the common mode signal only, i.e. the left channel or the right channel or any other channel, however without differential mode. Thus, there are different combinations of the inventive loudspeaker module with conventional loudspeakers to the effect that the effort for the acoustic irradiation may be reduced according to the requirement, or is kept at a maximum level in the sense of a best possible acoustic irradiation result, while an inventive loudspeaker module is used on the left side, in the center, and on the right side.

Both, the loudspeaker module to be installed in a vehicle and the loudspeaker system configured as a shelf loudspeaker are advantageously controlled with the inventive apparatus, which is also referred to as a control circuit, configured to generate the control signals for the three elementary loudspeakers, i.e. the two midrange speakers or woofers and the tweeter, from at least two channel signals of a multi-channel audio signal. This apparatus for generating control signals is either configured to be integrated into the loudspeaker module or into the shelf loudspeaker, or into any other loudspeaker system with two loudspeakers, or is arranged separately from the loudspeaker system, or the loudspeaker system housing. In the first case, only the two channel signals of the multi-channel audio signal have to be supplied to the loudspeaker system housing, and the apparatus for generating control signals generates the three control signals for the individual elementary loudspeaker internally, i.e. in the loudspeaker system housing. In this case, amplification means in the form of an individual audio amplifier, e.g. for each control signal, are advantageously provided in the loudspeaker housing. In an alternative embodiment in which the apparatus for generating control signals is configured separately, the apparatus for generating control signals includes an input interface to obtain the two channel signals. In this case, the apparatus for generating control signals is advantageously configured as an app, bit or as a hardware element in a mobile device such as a mobile telephone, a tablet, etc. Furthermore, an output interface is provided so as to transfer the control signals in a fully conditioned manner either wirelessly or in a wired way, however, advantageously not amplified, to the loudspeaker housing which in turn has an input interface to receive the control signals, and which further comprises an amplifier stage to accordingly amplify the respective control signals.

A separate arrangement of the amplifier stage outside of the loudspeaker system housing is possible, wherein, in this case, cables are advantageously provided between the amplifier stage and the loudspeaker system housing so as to provide the amplified control signals to the corresponding elementary loudspeakers, i.e. the tweeter and the midrange speakers or woofers in the loudspeaker system housing.

Figure 2:
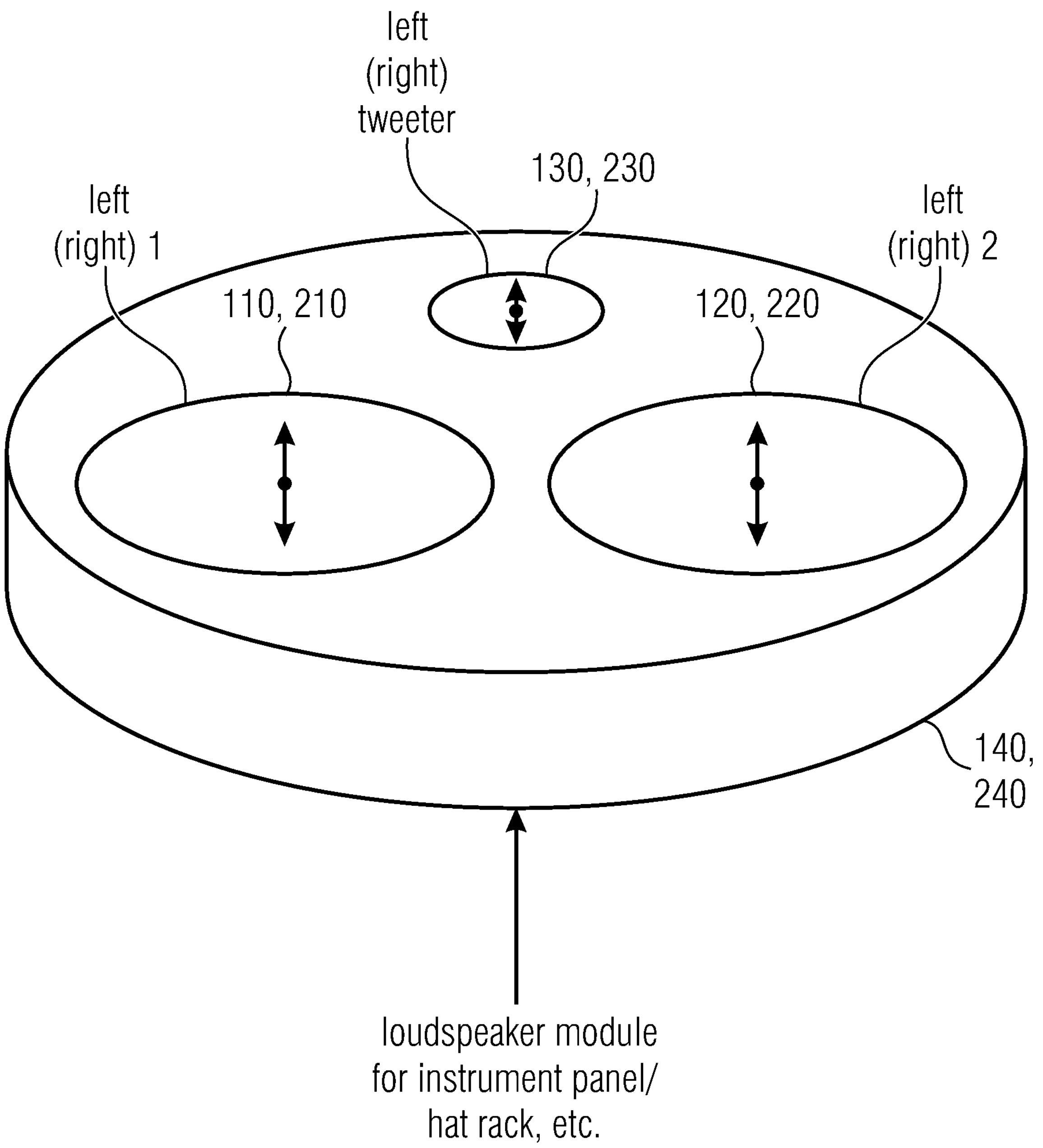
FIG. 2 shows a loudspeaker module for an instrument panel, a rear shelf, etc., or a loudspeaker module according to an embodiment with a separate tweeter.

FIG. 2 shows a loudspeaker system with a tweeter 130, 230, two midrange speakers or woofers 110, 210, or 120, 220, that are separately controllable, and a loudspeaker system housing 140, 240. In particular, the tweeter 130, 230 and the two midrange speakers or woofers 110, 210, or 110, 220, are arranged in the loudspeaker system housing, wherein, in particular, the tweeter 130, 230 is arranged between the two midrange speakers or woofers 110, 210, as can be seen in FIG. 2. However, in particular, the arrangement between the two midrange speakers or woofers is not directly where the smallest distance of the two midrange speakers or woofers is located, but is displaced slightly towards the outside. In principle, it is possible to arrange the woofer directly between the two sound transducers 110, 210 and 120, 220.

However, for reasons of spatial efficiency, as is shown in FIG. 2, it can make sense to arrange the tweeter in an area of the loudspeaker system housing that is not yet occupied by the two midrange speakers or woofers. To achieve a good sound quality and to obtain a good match of the emissions of the two midrange speakers or woofers on the one hand and the tweeter on the other hand, the tweeter is arranged between the two midrange speakers or woofers. Through this, the listener perceives the emission the tweeter at the same spatial location as the emissions of the woofers. The woofers or midrange speakers emit the "normal" common mode signal, i.e. e.g. the left audio signal, if the loudspeaker system in FIG. 2 is illustrated for a left loudspeaker. Since this audio signal is emitted by two individual sound transducers, the sound signal is stronger as is the case if it was emitted by a single sound transducer, so that sound transducers of a smaller size are sufficient to generate the same sound pressure in the air and therefore the same volume for the listener. According to the invention, the two midrange speakers or woofers not only emit the common mode signal, but also the differential mode signal. The emission of the differential mode signal requires two individual sound transducers that are controlled with the corresponding signal, i.e. that are controlled separately. The differential mode signal leads to the fact that the sound that is excited is not only a common mode sound, but also the differential mode component leading to the differential mode sound in the air.

In the embodiment shown in FIG. 2, the loudspeaker system housing is a flat housing in which a top side of the loudspeaker system housing has a length or a width or a diameter that is at least twice as large as a height of the loudspeaker system housing. Greater ratios to the extent that the shape is very flat, to the extent that not just twice the magnitude is achieved by the length or the width or the diameter, but at least five times the magnitude, are also advantageous. In addition, in the embodiment shown in FIG. 2, the tweeter and the two midrange speakers or woofers each comprise a membrane that is deflectable essentially perpendicular to a surface of the loudspeaker system housing, as is illustrated in FIG. 2. That is, e.g., the membranes are deflected in parallel to the top side with respect to their center area, where FIG. 2 shows corresponding schematic movement sectors, if the top side has a planar shape. In addition, the membrane of the tweeter is deflected in the same direction.

This enables achieving a flat loudspeaker module that may be housed in an instrument panel, or a rear shelf, or any other flat possibility for installation, such as a door or a side panel in a vehicle. A loudspeaker system as shown in FIG. 2 is required to reproduce a left audio channel. In this case, the loudspeaker system is arranged at a left location with respect to a listener position, such as with respect to a sweet spot in a reproduction space. The same loudspeaker system is also arranged at the right position so that six membranes operate in total if a left and a right loudspeaker system are present. If a center loudspeaker or a surround loudspeaker on the left or on the right side is provided, i.e. if all five positions of a 5.1 scenario are provided with a loudspeaker system, five loudspeaker systems with 15 individual membranes in total are used.

Figure 4:
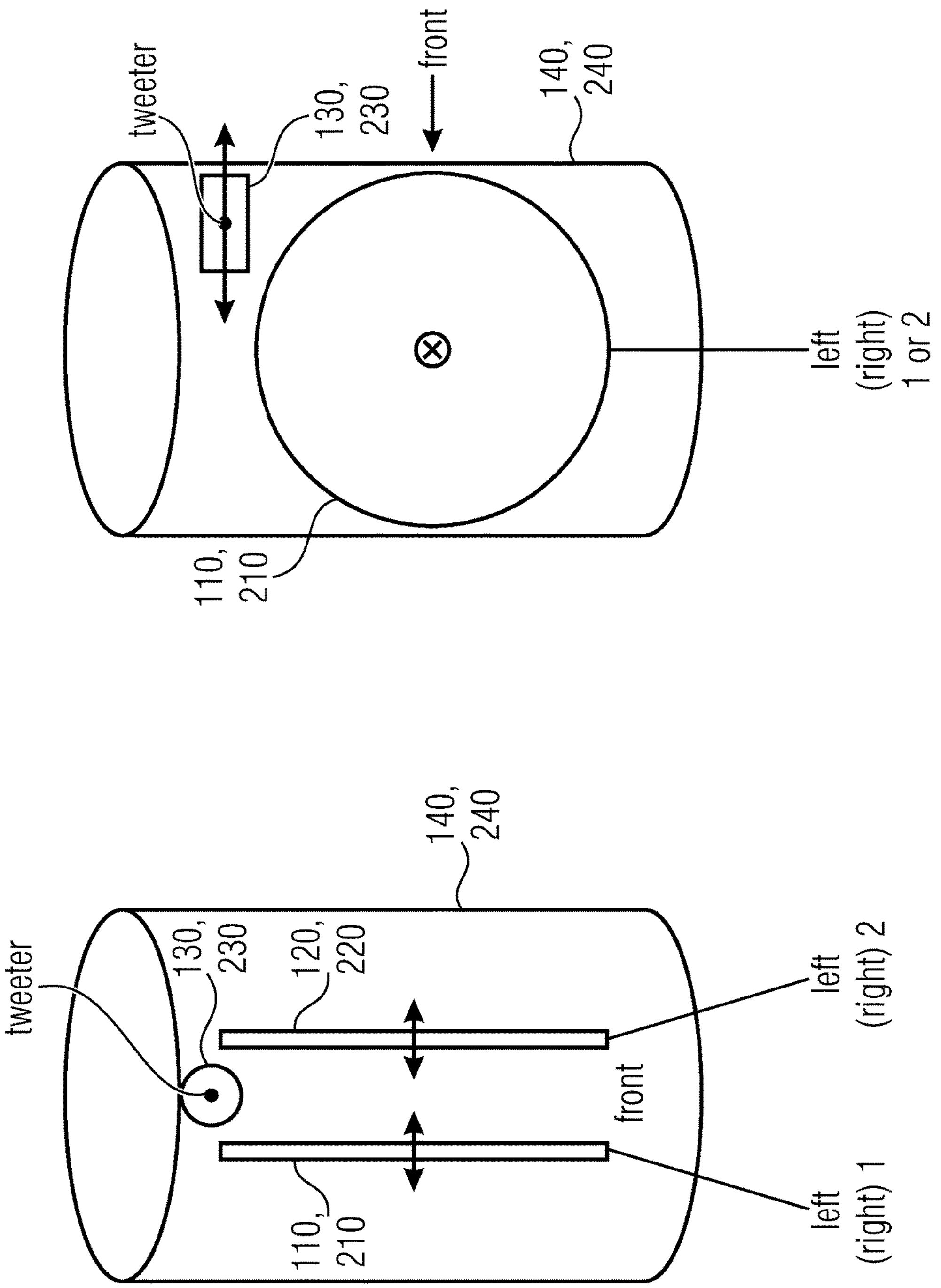
FIG. 4 shows a front view and a side view in a schematic form (with a transparent housing) of a shelf loudspeaker, or a loudspeaker module according to a further embodiment with a separate tweeter.

FIG. 4 shows an alternative embodiment of the loudspeaker system as a shelf loudspeaker. Here, the loudspeaker system housing has a cuboid or cylindrical shape that stands upright, wherein the two midrange speakers or woofers each comprise a membrane, wherein the first membrane of a first midrange speaker or woofer is arranged in parallel to a second membrane of a second midrange speaker or woofer extending in the loudspeaker system housing from top to bottom, as is shown in FIG. 4 in the left image, which shows a top view from the front, and in FIG. 4 in the right image, which shows a top view of the side of the shelf loudspeaker. Again, the tweeter is arranged between the first and the second membrane, as is shown in FIG. 4, however, in contrast to FIG. 2, it is now deflectable essentially perpendicularly to the first and the second membrane.

The schematic illustration shown in FIG. 4 is such that the loudspeaker system is drawn to be transparent, so to speak. Again, depending on the implementation, it may have a cuboid shape or also a cylindrical shape. In any case, the shelf loudspeaker has a front direction that may be directed towards the area to be acoustically irradiated. Furthermore, the first and second membranes are arranged essentially in parallel to the front direction and are deflectable essentially perpendicularly to this front direction, wherein a front side of the loudspeaker housing is essentially parallel and perpendicular to the front direction if the front side has a flat shape, or comprises at least an area that is essentially perpendicular to the front direction if the front side is curved, for example. Then, there is an area of the curvature having a directional vector directed perpendicularly to the deflection of the two membranes.

Figure 3:
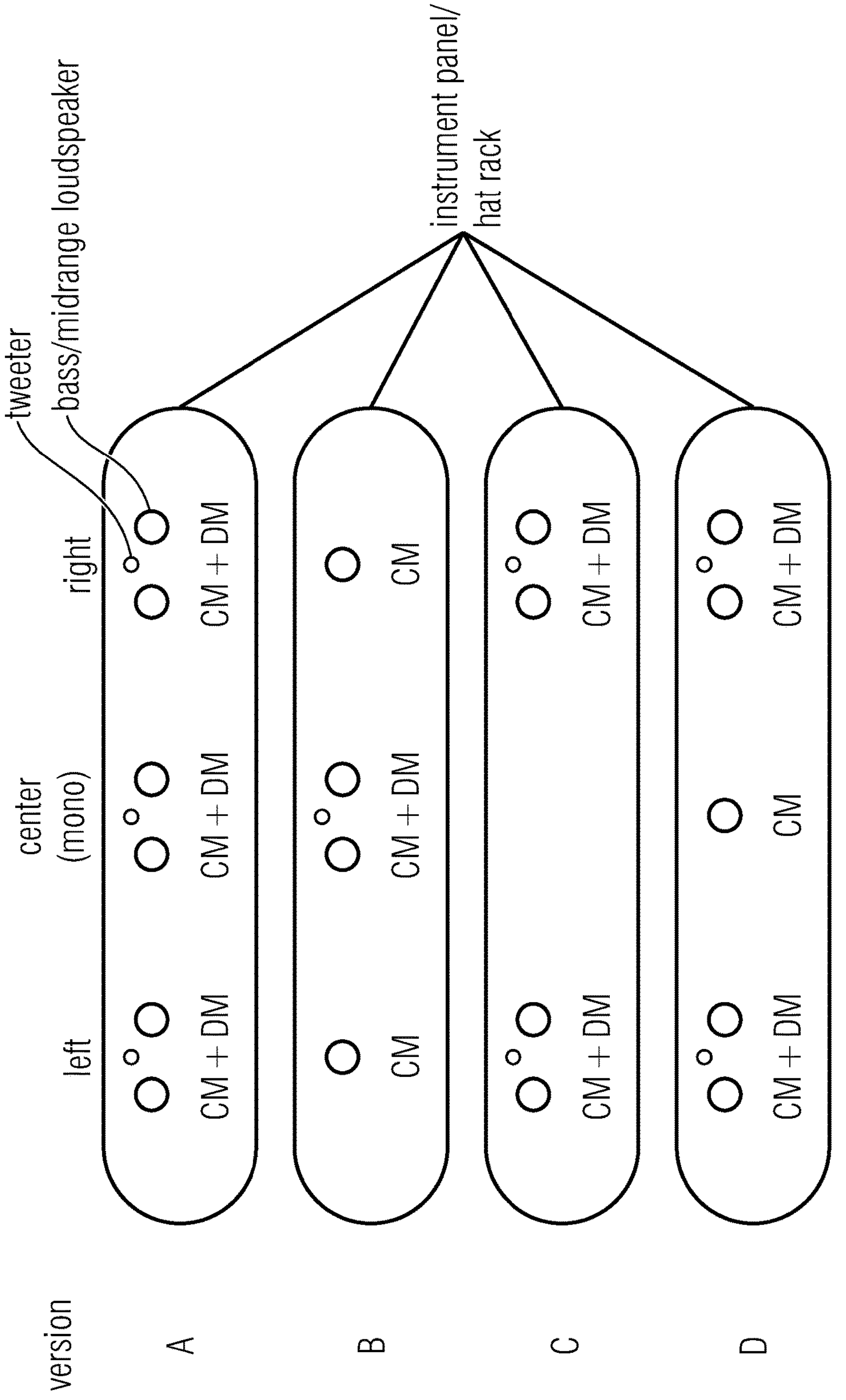
FIG. 3 shows different configurations for a loudspeaker installation in an instrument panel, a rear shelf, or any other area in a vehicle, or an overview for configurations of loudspeaker modules at different positions in a vehicle for modules of FIG. 1 with tweeters and CM (common mode) and DM (differential mode) control according to a further embodiment.

FIG. 3 shows different configurations for a loudspeaker installation in an instrument panel and/or a rear shelf and/or a similar area in a vehicle. The vehicle may be any vehicle that is operated in water, in air, or on land, or in space. Version A shows a maximum equipped configuration, wherein a loudspeaker system is arranged at the left position, at the right position, and in the center position, as is shown schematically. The loudspeaker system housing of each individual loudspeaker module of FIG. 2 does not have to be fully closed. Instead, it may be configured only so that it carries the individual membrane with respect to each other, and an outer wall towards the front side represents the rear shelf and/or the instrument panel, and a confinement towards the bottom side is also provided, wherein this confinement may accommodate all three loudspeaker systems, however.

Version B shows a reduced effort version, wherein only the center loudspeaker system is configured to emit the common mode and the differential mode, whereas the two loudspeaker systems on the left and the right side only comprise a single midrange speaker or woofer that emits only the common mode signal, or the common mode.

Version C shows an implementation without a center loudspeaker, wherein a loudspeaker system according to the present invention is arranged only on the left side and the right side, said loudspeaker system emitting in such a way the common mode and the differential mode in the midrange and the bass range, whereas the tweeter only emits a common mode signal, since it operates with a single sound transducer only. However, it has been found that an emission of just the common mode signal is sufficient for the excellent sound quality of the present invention, and that an additional implementation of the tweeter with a common mode signal does not lead to a significant improvement of the sound quality, which is why the effort required to this end may be omitted, in contrast to the case in which two tweeters would be used for the treble range.

Version D shows a further implementation, having the configuration selected in version C, however, wherein, for support of the center signal, a simple sound transducer is additionally provided to emit the center signal that is typically a mono signal obtained by addition of the left and the right side, or which is available separately in the multichannel audio signal.

Version A of FIG. 3, with a left loudspeaker 140, a center loudspeaker 150, and a right loudspeaker 240, may be installed in an instrument panel, wherein a windshield of a vehicle, such as a motor vehicle, is additionally illustrated above the instrument panel.

Figure 5:
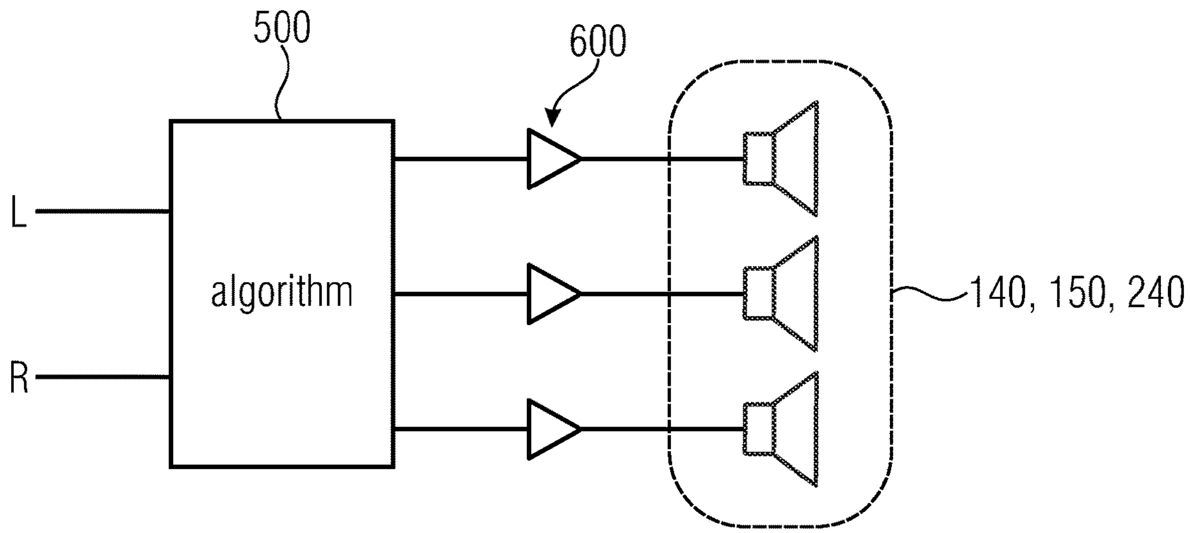
FIG. 5 shows a schematic arrangement of an apparatus for generating a control signal, an amplifier stage, and a loudspeaker system, or an apparatus for generating control signals, or an algorithm, for the different loudspeakers each comprising two individual loudspeakers and a tweeter advantageously arranged therebetween.
Figure 7:
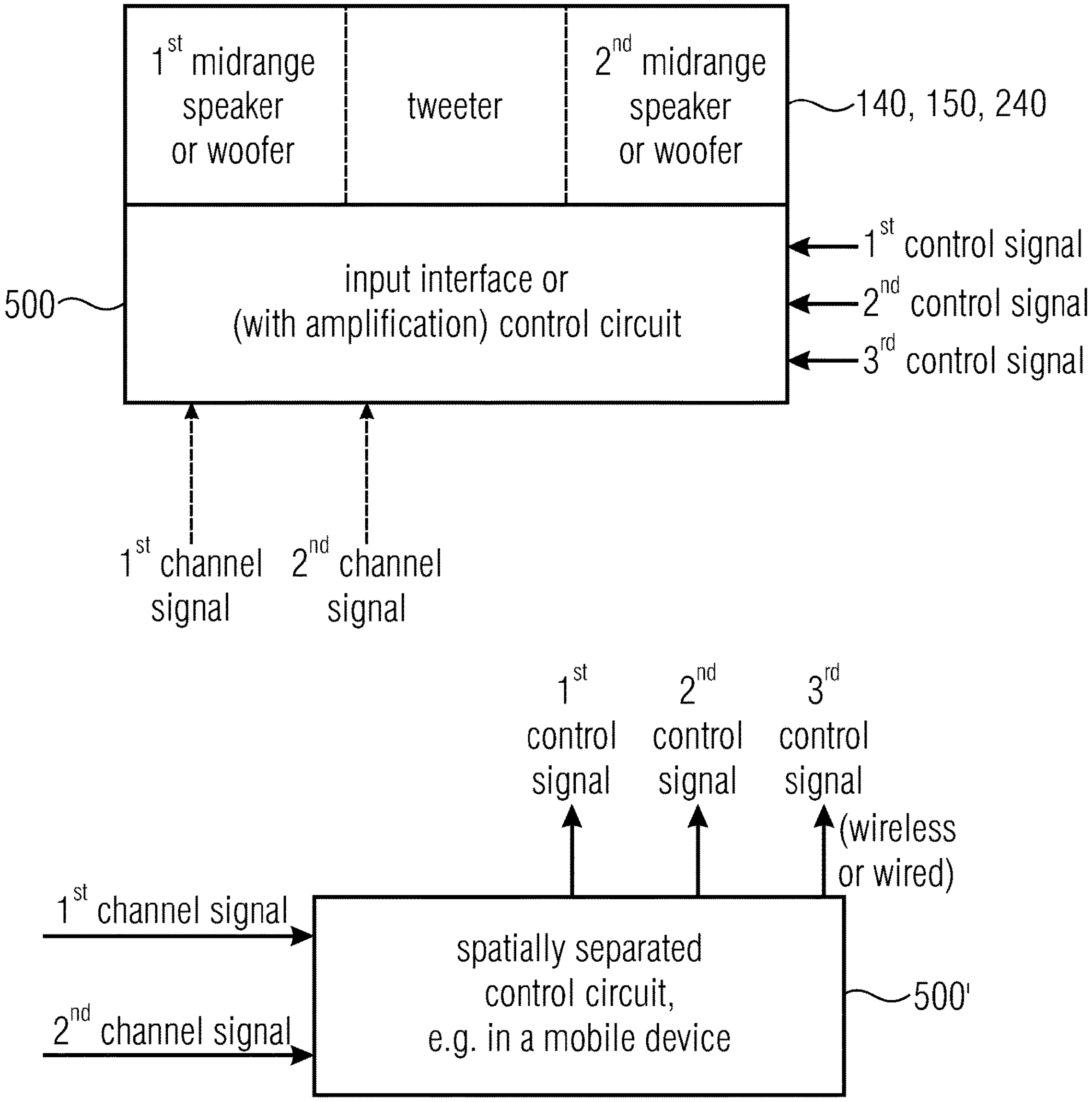
FIG. 7 shows a schematic illustration of the apparatus for generating control signals integrated into the loudspeaker system housing and separate from the loudspeaker system housing.

FIG. 5 shows the loudspeaker system, indicated with respect to the loudspeaker system housing 140, 150, 240, together with the amplifier stage 600 for amplifying the control signal for the three sound transducers, and an apparatus for generating control signals 500 that generates from a first channel signal and a second channel signal, i.e. e.g. from the left channel and the right channel of a multichannel audio signal, the three control signals for the tweeter and the two midrange speakers or woofers. This apparatus for generating control signals is indicated in FIG. 5 in its entirety by means of the reference numeral 500 as a calculation algorithm. The implementation may be carried out in software, in hardware, or in a mixed software/hardware implementation, according to the embodiment. In addition, as is exemplarily shown in FIG. 7, the apparatus for generating control signals 500 may be implemented separately, leading to the apparatus for generating control signals 500' in FIG. 7, configured to be spatially separated from the loudspeaker system and for example being in a mobile device. Then, the first channel signal and the second channel signal are fed into the spatially separated control signal 500', and the same outputs the three control signals for the three sound transducers in the loudspeaker system. Depending on the embodiment, this output is carried out in a wireless or in a wired manner. However, if the apparatus for generating control signals 500 is directly implemented in the loudspeaker system housing 140, 150, 240, i.e. in addition to the spatial proximity to the midrange speaker or woofer, also in spatial proximity to the tweeter and to the further midrange speaker or woofer, the apparatus for generating control signals also obtains the first channel signal and the second channel signal. In this case, the apparatus for generating control signals 500 is not only integrated into the loudspeaker system, but the loudspeaker system further includes the amplifier stage 600 of FIG. 5 and a corresponding current supply, which is either cable-operated or battery-operated, e.g. with a corresponding accumulator that is advantageously configured to be rechargeable. However, if the apparatus for generating control signals 500' is spatially separated from the loudspeaker system, the loudspeaker system just includes an input interface to obtain three control signals. Then, the control signals are typically just amplified in the loudspeaker system housing, which is particularly required if the wireless transfer of the control signals from the spatially separated apparatus for generating control signals to the loudspeaker system is carried out. In this case, the amplifiers in the amplifier stage also require a current supply. However, if the transfer is carried out in a wired manner, or with a cable, from the spatially separated apparatus for generating control signals to the loudspeakers, the loudspeaker modules themselves do not need their own current supply, since signals that are amplified already reach the loudspeaker system.

Figure 6:
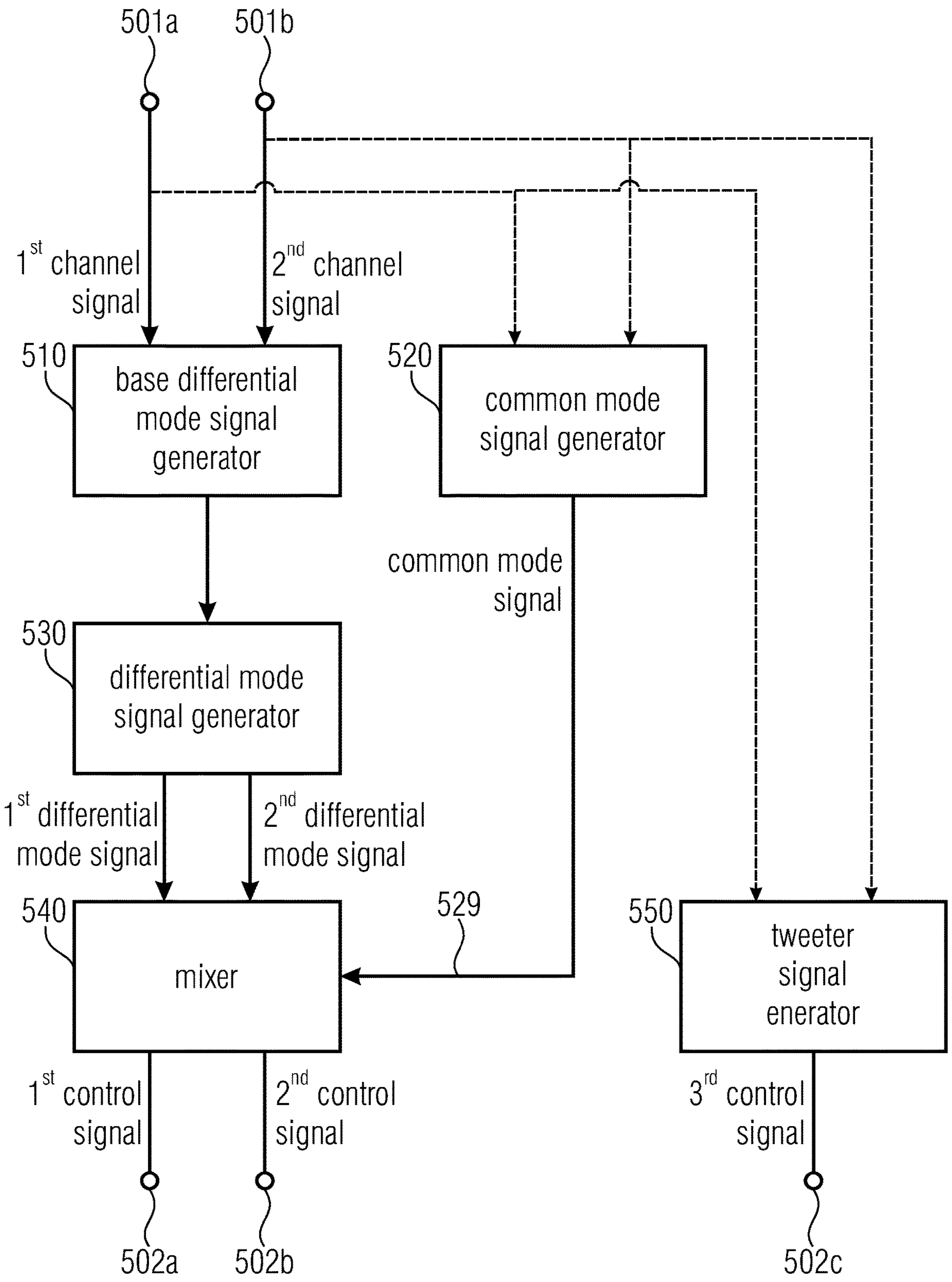
FIG. 6 shows a advantageous embodiment of the control circuit.

FIG. 6 shows a advantageous embodiment for a apparatus for generating control signals 500 or 500'. The apparatus for generating control signals includes a first input 501*a* for a first channel signal of a multi-channel audio signal, and a second input 501*b* for a second channel signal of the multi-channel audio signal. Furthermore, a first output 502*a* for a first control signal for the first midrange speaker or woofer is provided. In addition, a second output 502*b* for a second control signal for the second midrange speaker or woofer is provided. Finally, a third output 502*c* for a third control signal for the tweeter is provided. The apparatus for generating control signals further includes a base differential mode signal generator 510 for forming a base differential mode signal from the first channel signal at the first input and the second channel signal at the second input. In addition, a common mode signal generator 520 for generating a common mode signal from the first channel signal or the second channel signal or both channel signals for the first controlled signal and the second controlled signal is provided. In addition, the apparatus for generating control signals includes a differential mode signal generator for generating a first differential mode signal and a second differential mode signal from the base differential mode signal at the output of the block 510, wherein the first differential mode signal is phase-shifted with respect to the second differential mode signal. In addition, a mixer is provided to mix the common mode signal with the first differential mode signal so as to obtain the first control signal, and to mix the common mode signal with the second differential mode signal so as to obtain the second control signal. Thus, the mixer 540 provides the two control signals for the midrange speakers or woofers at the outputs 502*a*, 502*b*. In addition, the apparatus for generating control signals includes a tweeter signal generator 550 for generating a third control signal from the first channel signal and the second channel signal or from both channel signals, according to the implementation of the loudspeaker. If the loudspeaker is configured as a left loudspeaker, the common mode signal generation 520 and the tweeter signal generation operates on the basis of the first, or left, channel signal, as will be explained on the basis of FIG. 9. However, if the loudspeaker system is arranged at the right reproduction position of a reproduction scenario, the common mode signal generator 520 and the tweeter signal generator 550 operate with the second or right channel signal. However, if the loudspeaker system is configured for the center channel, i.e. for the central reproduction position, as is illustrated with reference to FIG. 10, the common mode signal generator 520 and the tweeter signal generator 550 operate with both channel signals, wherein a sum of both of these signals may be typically formed in blocks 520, or 550. However, all loudspeakers operate at each reproduction position with the two channel signals to obtain in the base differential mode signal generator 510 the base differential mode signal that is then conditioned by means of the actual differential mode signal generator 530 to become the first differential mode signal and the second differential mode signal, which are phase-shifted with respect to each other, and which are advantageously phase-shifted by 180° with respect to each other, as will be illustrated.

FIG. 8*a* and FIG. 8*b* show different implementations of the differential mode signal generator. In the implementation shown in FIG. 8*a*, a phase shifter 531 is arranged in front of the frequency filter, or in front of the spectral interlacing means, whereas, in the implementation shown in FIG. 8*b*, the phase shifter 531 is arranged behind the spectral interlacing means 535 in the direction of the signal flow. According to the invention, only the low-pass range of the base differential mode signal (prior to the phase shift) or of two phase-shifted base differential mode signals is subjected to spectral interlacing, whereas the higher frequency range of the control signal for the midrange speakers or woofers is not subjected to spectral interlacing, but is directly guided to the two midrange speakers or woofers so as to generate here a non-spectrally filtered differential mode signal. Spectral interlacing in the low frequency range ensures that the two differential mode signals do not cancel each other out in the air even though they are phase-shifted. This could happen if the size of the sound transducers of the midrange speakers or woofers, or the distance of them, is not large enough. Since there are constructive boundaries in this regard, it is advantageous to perform corresponding spectral interlacing of the first differential mode signal with respect to the second differential mode signal in the low-pass range obtained by the frequency filter 532, as will be illustrated on the basis of FIGS. 8*c*, 8*d*, 8*e*. In contrast, it has been found that such spectral interlacing in the treble range of the base differential mode signal does not have to be carried out, and should not be carried out, since the constructive conditions of the two midrange speakers or woofers and the geometrical arrangement and the geometrical distance are sufficient so that the differential mode propagates in the air excited by the loudspeaker system.

Thus, in the present invention, a differential mode is not generated in the treble range since this does not lead to any significant improvement of the perceived sound field. In the mid frequency range, i.e. in the high-pass range of the midrange or bass signal, an unprocessed common mode signal is generated that has not been subjected to any spectral interlacing so as to generate and to perceive in the midrange, which is particularly important for the perception, the entire differential mode signal, or the entire differential mode component in the sound field. Spectral interlacing is only carried out in the low spectral range, i.e. in the low-pass range of the base differential mode signal, to ensure that a sufficiently strong differential mode component is also perceived in the low frequency range, which is also important for the perception of a differential mode component. The means for spectral interlacing therefore makes it possible to achieve a good perception of the differential mode component even in the area in which the constructive circumstances of the loudspeaker system are no longer optimal.

In the embodiment shown in FIG. 8*a*, the base differential mode signal generated by the base differential mode signal generator 510 in FIG. 6 is supplied to the phase shifter 531 configured to shift the base differential mode signal by a first phase value so as to obtain a first phase-shifted signal, and to shift the base differential mode signal by a second phase value so as to obtain a second phase-shifted signal, wherein the second value differs from the first value. Both phase shift values are advantageously equal, however with a different sign, and are in particular advantageously 90° for the first phase value and −90° for the second phase value. However, alternative values may also be used, as long as both values are different. However, the quality becomes better if the first phase value and the second phase value have the same value, but a different sign. The best results are obtained if the two phase values are around 90°, or in a range of 60° to 120°, and have different signs. As long as the difference of the two signed phase values is large enough, an asymmetric phase shift by means of the phase shifter to the extent that the first phase value is for example −60° and the second phase value is 120° may also lead to good results, since a phase difference between the first phase-shifted signal and the second phase-shifted signal of 180°, or in a range between 150° and 210°, is particularly advantageous.

The phase shifter 531 has connected downstream thereof a frequency filter 532 configured to filter the first phase-shifted signal so as to obtain a first high-pass signal and a first low-pass signal. Furthermore, the frequency filter 532 is configured to filter the second phase-shifted signal with respect to its frequency so as to obtain a second low-pass signal and a second high-pass signal. The two low-pass signals generated by the frequency filter 532 are supplied to the spectral interlacing means 533, which applies a first spectral filter to the first low-pass signal and a second spectral filter to the second low-pass filter to the extent that the two output signals of the spectral interlacing means 533 are different. Advantageously, the signals are different in that both signals comprise frequency portions that are complimentary with respect to each other, i.e. so that the first spectral filter attenuates in a first range in which the second spectral filter has a passthrough range, and vice versa. The first spectral filter does not necessarily have to fully attenuate in a range in which the spectral filter has a passthrough range. However, instead, it is already sufficient that a certain attenuation is achieved, such as at least 3 dB, and advantageously at least 6 dB, with respect to the signal power. Thus, filters that are not overly elaborate, particularly bandpass filters, are sufficient for the first spectral filtering and the second spectral filtering to the extent that a bandpass filter has an attenuation of around 6 dB for the first low-pass signal in a spectral range in which the second spectral filter has a bandpass that here has a passthrough range and comprises none or only little attenuation.

In addition, in the embodiment shown in FIG. 8*a*, the mixer 540 is configured to establish the first control signal from the first high-pass signal with the first filtered signal and the common mode signal, wherein the mixer 540 is further configured to obtain the second control signal from the second high-pass signal, the second filtered signal at the output of the spectral interlacing means, and the common mode signal. Alternatively, the first filtered low-pass signal and the first high-pass signal may be combined so as to obtain the entire first differential mode signal before it is then fed into the mixer 540. However, to reduce the number of components, the mixer combines the first high-pass signal and the common mode signal (GLTS) together with the filtered low-pass portion as a first differential mode signal that is not complete, so to speak, in a combiner such as an adder stage, a filterbank stage, or any other corresponding element.

However, if a combination of the filtered low-pass signal and the corresponding high-pass signal is carried out, e.g. by means of a filterbank, and the common mode signal GLTS is present in the time domain, the mix in the mixer would first include the filterbank so as to generate from the high-pass signal and the corresponding filtered low-pass signal the corresponding complete differential mode signal that is then combined with the common mode signal also present in the time domain by means of a time domain adder that carries out sample-wise addition, for example.

In the embodiment shown in FIG. 8*b*, the frequency filter 534 is directly applied to the base differential mode signal so as to obtain a low-pass signal and a high-pass signal. The low-pass signal is supplied to the spectral interlacing means 535 so as to obtain two spectrally interlaced, or filtered, signals. They are then combined in the combiner 536 each with one and the same high-pass signal so as to obtain the two differential signals not yet phase shifted at the output of the combiner 536. They are then phase shifted in a downstream phase shifter 531 accordingly so as to obtain at the output of the phase shift 531 the complete differential mode signals, i.e. the first and the second differential mode signal, that are then fed into the mixer 540 so as to be combined accordingly with the common mode signal.

Figure 8C:
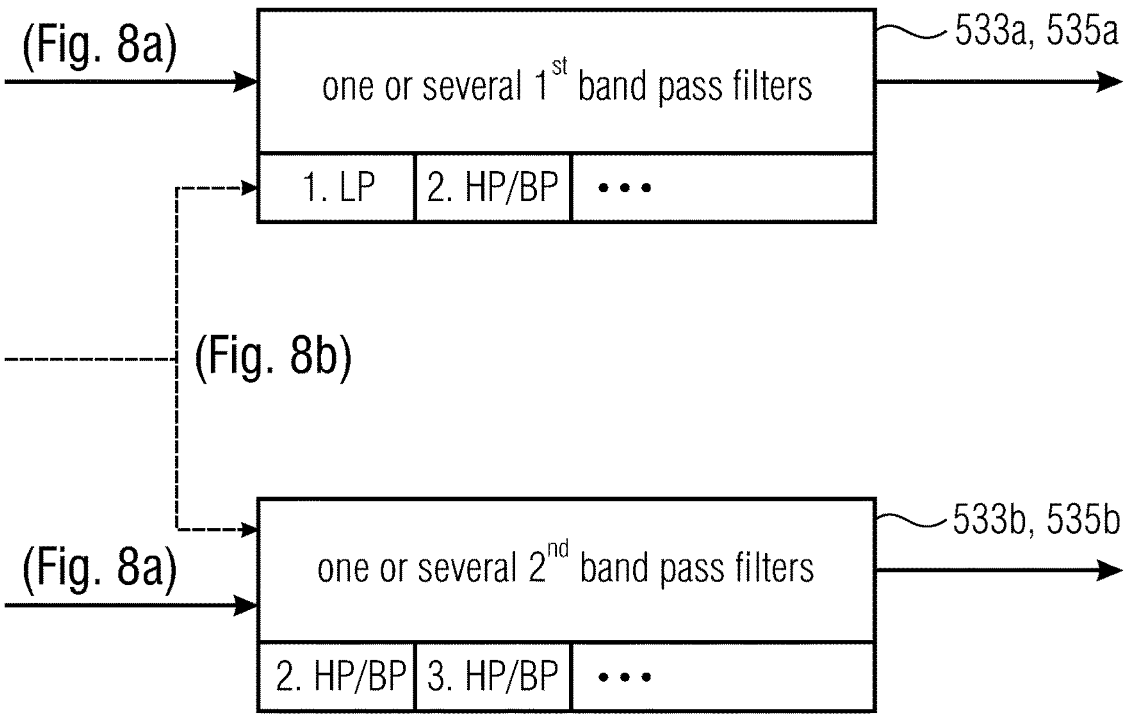
FIG. 8*c* shows a schematic implementation of the spectral interlacing means with overlapping passthrough regions/cutoff regions.
Figure 8C:
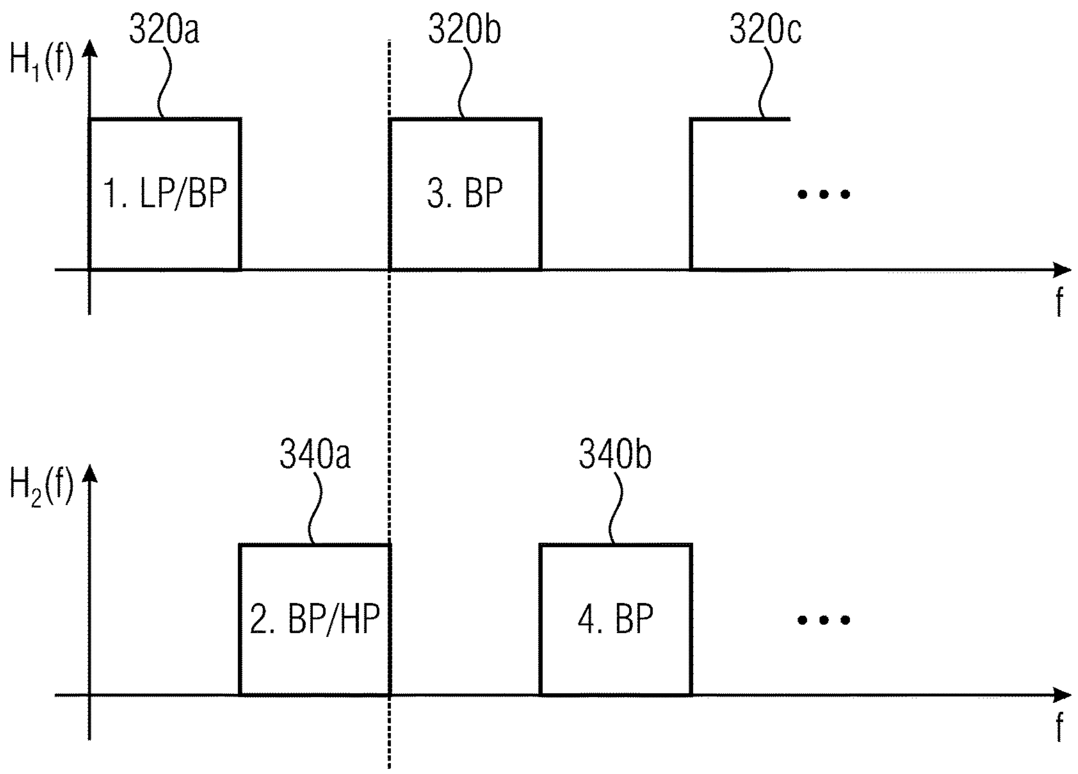

FIG. 8*c* shows a advantageous implementation of the spectral interlacing means to the extend that the same includes a first or several first bandpass filters 533*a*, 535*a*. The second filter advantageously includes one or several bandpass filters, as is shown at 533*b*, 535*b*. In the implementation shown in FIG. 8, the spectral interlacing means already obtains two different signals, i.e. the first low-pass signal and the second low-pass signals, or, if the spectral interlacing means is applied to the entire frequency range of the base differential mode signal, it obtains the entire accordingly phase shifted base differential mode signal shifted with the first phase value, and the corresponding base differential mode signal shifted with the second phase value. In the case of FIG. 8*a*, the spectral interlacing means obtains two different signals that either have only the lower frequency range or the corresponding upper frequency range.

However, if the implementation shown in FIG. 8*b* is selected, the spectral interlacing means obtains a single signal that is fed into the one or the several first bandpass filters 533*a*, 535*a* and into the one or the several second bandpass filters 533*b*, 535*b*, which is illustrated in FIG. 8*b* by means of a branching point of the dotted input signal.

The passthrough ranges of the corresponding filters are schematically illustrated in FIG. 8*c*. The one or the several first bandpass filters advantageously include a first low-pass signal 320*a*, or a first bandpass signal, that, however, has the same bandwidth as the first low-pass filter. Then, the one or the several second bandpasses include a second bandpass signal, however, which also may be a high-pass signal in the minimum configuration. In the example shown in FIG. 8*c* left of the dotted line, the simplest embodiment of the spectral interlacing means would be an implementation of the first spectral filter 533*a*, 535*a* with a first low-pass, and of the second spectral filter 533*b*, 535*b* with a second high-pass. An improved implementation includes as least two pairs of filters in the first spectral filter and the second spectral filter, i.e. the third bandpass filter 320*b* and the fourth bandpass filter 340*b*. In the case of this implementation, a second bandpass filter 340*a* will be configured as a bandpass and not as a high-pass. In a further implementation, a fifth bandpass 320*c* is provided, and a sixth bandpass accordingly arranged in the passthrough range, which is not shown in FIG. 8*c*.

Figure 8D:
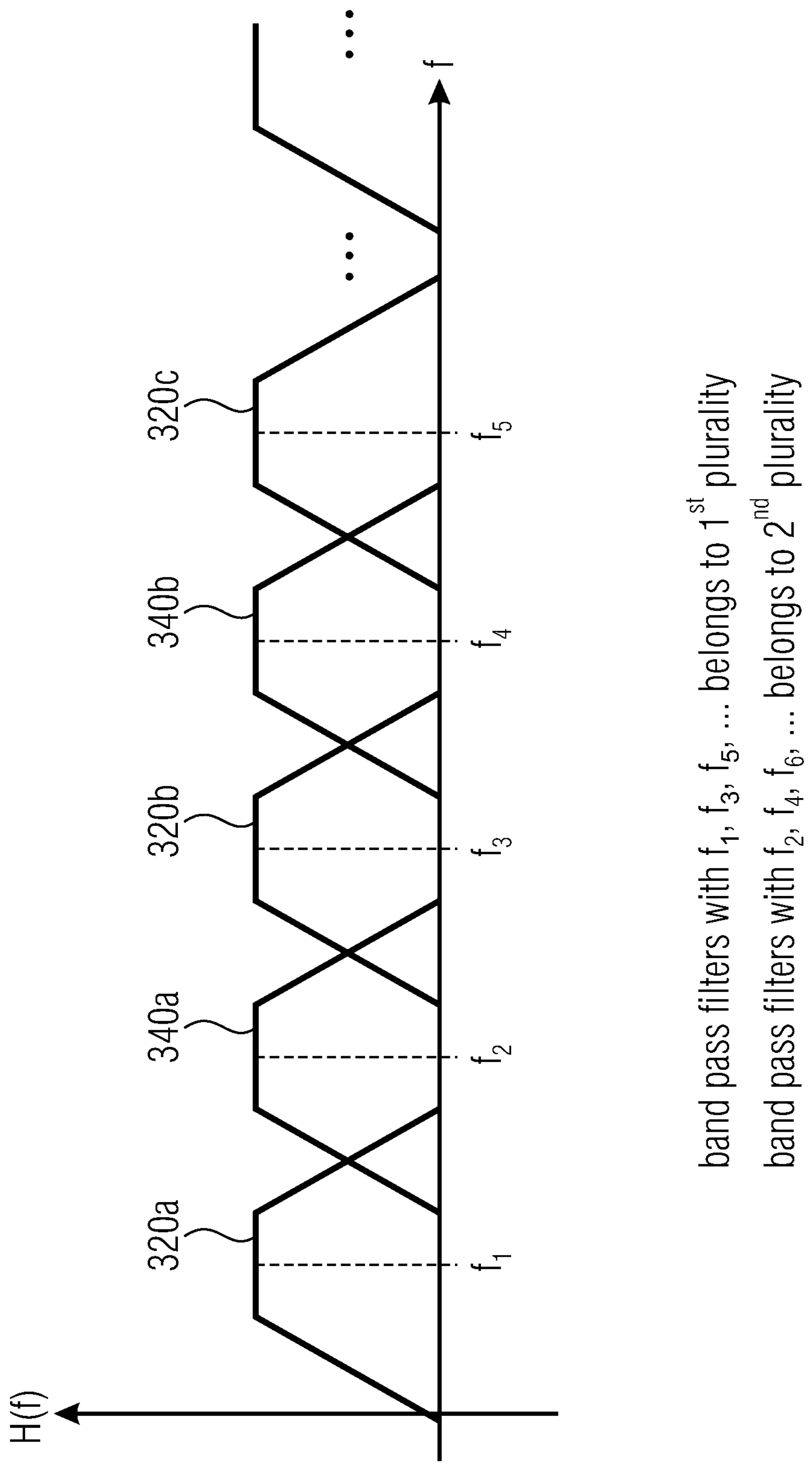
FIG. 8*d* shows a schematic illustration of the frequency transfer functions of both elements of the spectral interlacing means, or a schematic illustration of the two different pluralities of band-pass filters.
Figure 8E:
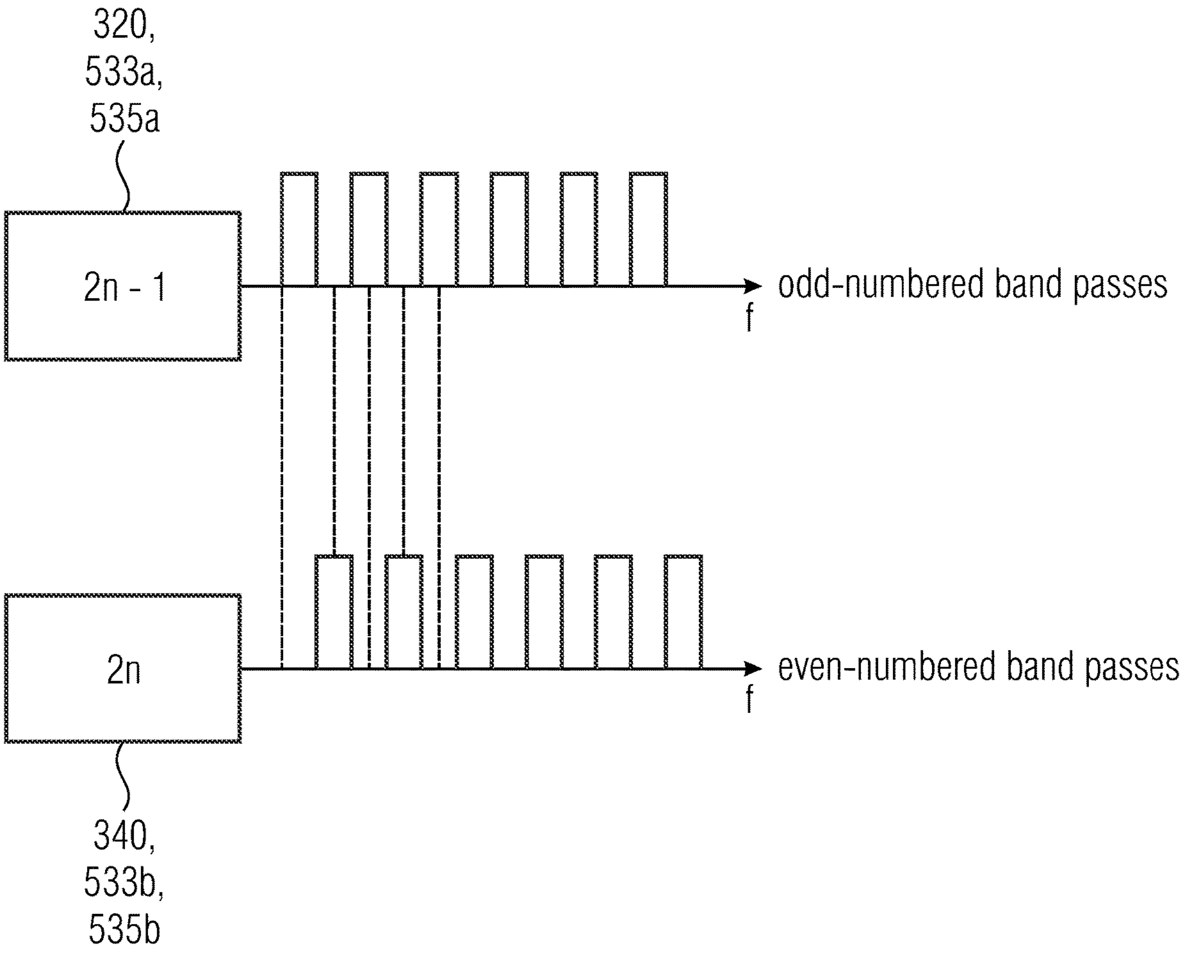
FIG. 8*e* shows an alternative implementation of the spectral interlacing means with odd-numbered and even-numbered band-passes, or a further schematic illustration of interleaved or interlocked or interlaced band-passes divided into odd-numbered and even-numbered band-passes.

Further implementations are shown in FIG. 8*d* and FIG. 8*e*. In one implementation, the rotating sounds field is not recorded separately, the base differential mode signal may be obtained from the side signal of a center-side signal processing, which may then be directly used or it may be used in a delayed or attenuated or amplified manner, depending on the implementation.

There are further possibilities to generate a base differential mode signal, wherein a rotating sound field component is generated, since the first differential mode signal and the second differential mode signal are overlapped with the common mode signal so that the two midrange or woofer sound generators in the loudspeaker system perform a differential mode signal excitation that is perceivable as a rotating sound field. Depending on the particular generation of the differential mode signal, the rotating sound field will correspond more strongly to the original physical rotating sound field. It has been found that a derivation of the differential mode signal from the common mode signal and a corresponding overlap by means of the mixer 540 of FIG. 6 already lead to a significantly improved listening impression compared to an implementation in which the two sound generators are only driven with a common mode signal and operate in a common mode manner.

FIG. 8*a* or FIG. 8*b* each shows a advantageous embodiment of the differential mode signal generator. In addition to the phase shifter 531 that generates the different phase shifts advantageously having different signs, a first plurality of bandpass filters 533*a*, 535*a* is provided for the upper signal path in the differential mode signal generator, and a second plurality of bandpass filters 533*b*, 535*b* is provided for the lower signal path.

The two bandpass filter implementations 320*a, b, c*, 340*a, b* of FIG. 8*c* differ from each other, as is illustrated schematically in FIG. 8*d*. The bandpass filter with the center frequency f1 illustrated at 320*a* in FIG. 8*d* with respect to its transfer function H(f), and the bandpass filter 320*b* with the center frequency f3 illustrated with 320*b*, and the bandpass filter 320*c* with the center frequency f5 belong to the first plurality of bandpass filters 320 and are therefore arranged in the first signal path 321, whereas the bandpass filters 340*a* and 340*b* with the center frequencies f2 and f4 are arranged in the lower signal pass 341, i.e. they belong to the second plurality of bandpass filters. Therefore, the bandpass filter implementations 320, 340 are configured to be interlaced with respect to each other, or interdigital or interleaved, so that the two signal transducers in one sound transducer element emit signals with the same full bandwidth but being different to the extent that each second band is attenuated in each signal. This enables the omission of the separation ridge, since the mechanical separation has been replaced by an "electrical" separation. The bandwidths of the individual bandpass filters are only drawn schematically in FIG. 8*d*. Advantageously, the bandwidths increase from bottom to top, i.e. in the form of a advantageously approximated Bark scale. In addition, it is advantageous that the entire frequency range is divided into at least 20 bands so that the first plurality of bandpass filters includes 10 bands, and the second plurality of bandpass filters also includes 10 bands, which then in turn reproduce the entire audio signal by means of superimposition due to the emission of the sounds generators.

FIG. 8*e* shows a schematic illustration to the extent that 2n even-numbered bandpasses are used in the generation for the upper control signal, whereas 2n−1 (odd-numbered bandpasses) are used for the generation of the lower control signal. Other divisions, or implementations, of the bandpass filters in a digital way, e.g. by means of a filterbank, a critically sampled filterbank, a QMF filterbank, or a Fourier transform of any type, or a MDCT implementation with a subsequent combination, or different processing of the bands, may also be used. Similarly, the different bands may also have a constant bandwidth from the lower end to upper end of the frequency range, e.g. from 50 to 10000 Hz or above, furthermore, the number of bands may be significantly larger than the 20, such as 40 or 60 bands, so that each plurality of bandpass filters represents half of the entirety of bands, such as 30 bands, in the case of 60 bands in total.

In the embodiment shown in FIG. 8*e*, odd-numbered bandpasses are arranged in the upper branch, and even-numbered bandpasses are arranged in the lower branch. However, the arrangement of even-numbered and odd-numbered bandpasses may also be reversed so that the upper signal is further processed with even-numbered bandpass filters. It is further to be noted that the order between the phase shifter 531, which is advantageously configured as an all-pass filter, and the (double) filterbank 533 may also be reversed. In alternative embodiments, the all-pass filters 531 may also be omitted, since in such a case the filterbanks in the element 533 already lead to the differential mode signals in the upper branch and the lower branch being different. An implementation with interlaced bandpass filters only without any all-pass filters, or where the branching point is directing the input into the filterbank 533*a*, 533*b* and the output of the filterbanks is directly connected to the corresponding input of the adder, e.g. in the mixer 540, also leads to a sound signal comprising translational and rotatory components.

The embodiment of the loudspeaker system is advantageously combined with the differential mode signal generation in which the two differential mode signals for the two midrange or woofer sound generators are generated by using interlaced bandpasses so that the frequency content of the one differential mode signal is essentially interlaced with respect to the frequency content of the other differential mode signal. However, it is to be noted that interlaced may here be understood as approximately interlaced, since bandpass filters comprise overlaps between neighboring channels, since bandpass filters with a very steep edge cannot be implemented, or only with great effort. A bandpass implementation as is schematically illustrated in FIG. 8*d* is also considered to be an interlaced bandpass filter implementation, even though there are overlapping areas between the different bandpass filters, however, which are attenuated with respect to the frequency portions in the center frequency of the respective bandpass filter by at least 6 dB and advantageously by at least 10 dB, for example.

Figure 9:
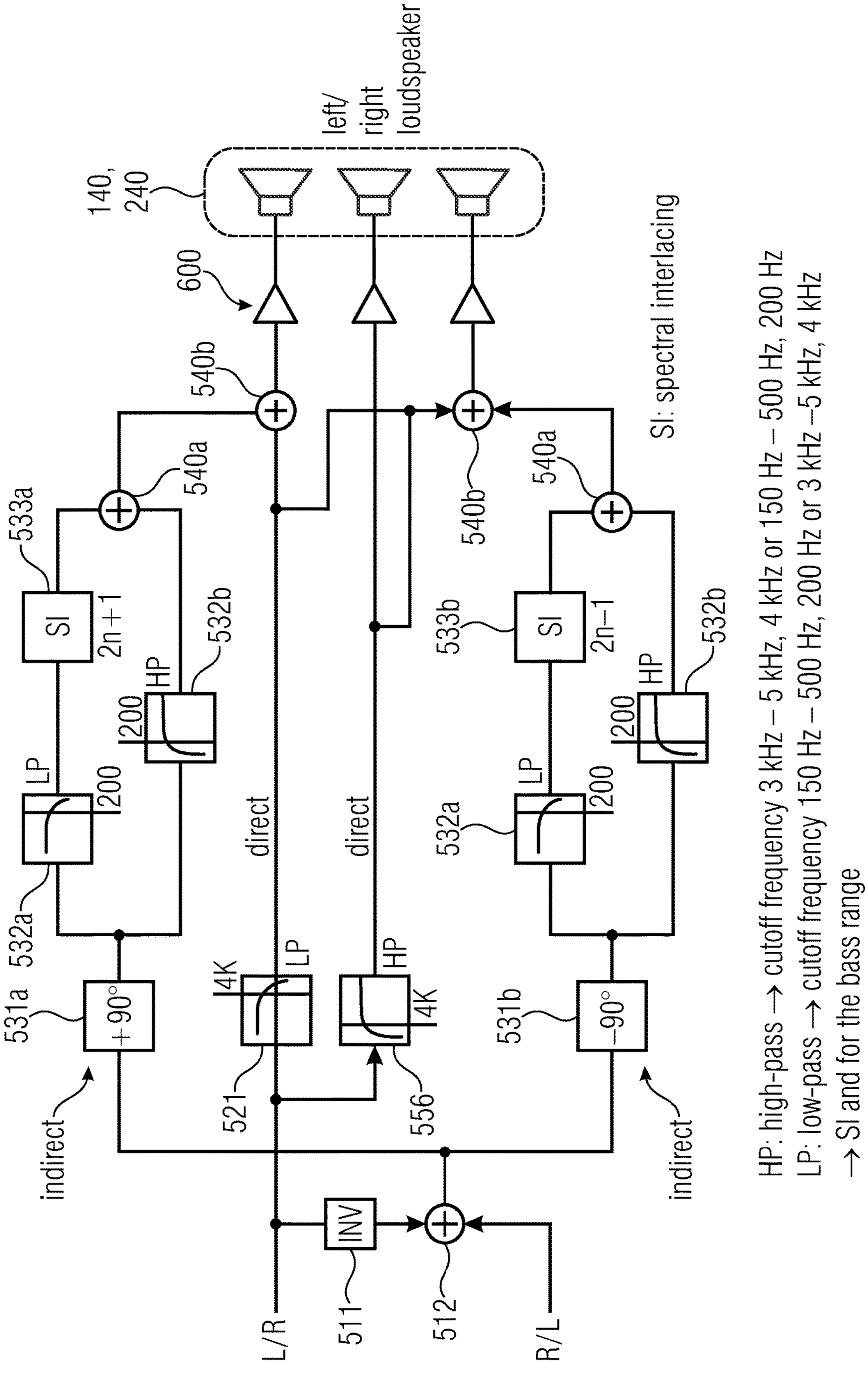
FIG. 9 shows a advantageous implementation of the apparatus for generating control signals with an amplifier stage connected downstream and a loudspeaker system for a left or right installation, or an apparatus for generating control signals, or algorithm, for the different loudspeakers each comprising two individual loudspeakers and a tweeter advantageously arranged therebetween.

Subsequently, further advantageous implementations of the control circuit as illustrated in FIG. 6 are explained on the basis of FIGS. 9, 10, 11, 12, 13. FIG. 9 shows an implementation of a loudspeaker system, or a control circuit, when using the signal as a left loudspeaker, or alternatively as a right loudspeaker. Here, the base differential mode signal generator 510 includes an inverter 511 and an adder 512 so as to generate for the left channel the base differential mode signal that is the difference (R−L). However, when using the loudspeaker as a right loudspeaker, the connections for L and R are interchanged, as is illustrated on the left side in FIG. 9. Then, the base differential mode signal at the output of the adder 512 represents the difference (L−R). Alternatively, the difference (L−R) may also be selected for the left loudspeaker, and the difference (R−L) may also be selected for the right loudspeaker. It is only advantageous that the base differential mode signal for the left and right side has a different sign.

In FIG. 9, the differential mode signal generator 530 includes the configuration shown in FIG. 8 with a phase shifter connected upstream. To this end, a phase shifter member 531*a* with the first phase value of +90° is provided, and a phase shifter member 531*b* with the second phase value of −90° is provided. In addition, the frequency filter 532 is configured in the upper branch to generate the first high-pass signal and the first low-pass signal, and in the lower branch to generate the second high-pass signal and the second low-pass signal. To this end, two individual low-pass members 532*a* are provided, and two individual high-pass members 532*b* are provided. In addition, the spectral interlacing means 533 is connected downstream of the low-pass members 532*a*. The spectral interlacing means includes the first spectral filter 533*a* and the second spectral filter 533*b* that each have complementary passthrough/blocking ranges. The outputs of the spectral interlacing means and the outputs of the high-pass members are separately added in the implementation shown in FIG. 9 so as to obtain the complete differential mode signals. To this end, the mixer includes the individual adders 540*a*. The actual addition, or mixing, of the corresponding differential mode signals with the common mode signal generated by the common mode signal generator 520 is carried out by the further adders 540*b* for the upper and lower branches. Spectral interlacing is denoted in FIG. 9 with SI. The common mode signal generation in the common mode signal generator 520 takes place in the low-pass 521, whereas the tweeter signal generation 550 of FIG. 6 takes place in the high-pass 556. FIG. 9 further shows that the common mode signal is supplied directly to the mixer 540*b*, so to speak, and that the tweeter signal, which is also a common mode signal, is also supplied directly to the corresponding amplifier of the amplifier stage 600. On the other hand, the two differential mode signals represent indirect signals that are each added to the common mode signal via the mixer 540*b* so as to obtain the control signals.

The high-pass cutoff frequency for forming the tweeter control signal, i.e. for forming the third control signal, is advantageously 4 kHz, however, may be in the range of between 3 kHz and 5 kHz. Accordingly, the low-pass cutoff frequency of the low-pass 521 for forming the common mode signal 529 may also be correspondingly set to the high-pass cutoff frequency, e.g. at 4 kHz, or is in a range of between 3 kHz and 5 kHz.

In addition, the low-pass or high-pass cutoff frequency for the frequency filter 532 in the differential mode signal generator 530 is accordingly lower, i.e. advantageously at 200 Hz. Depending on the implementation, however, this frequency may vary between 150 Hz and 500 Hz. Thus, in the embodiment shown in FIG. 9, there are two different high-passes and two different low-passes with frequency ranges for adjusting the corresponding cutoff frequency of 3 dB for the amplitude, or the cutoff frequency of 6 dB for the signal power, as is illustrated in FIG. 9.

Figure 10:
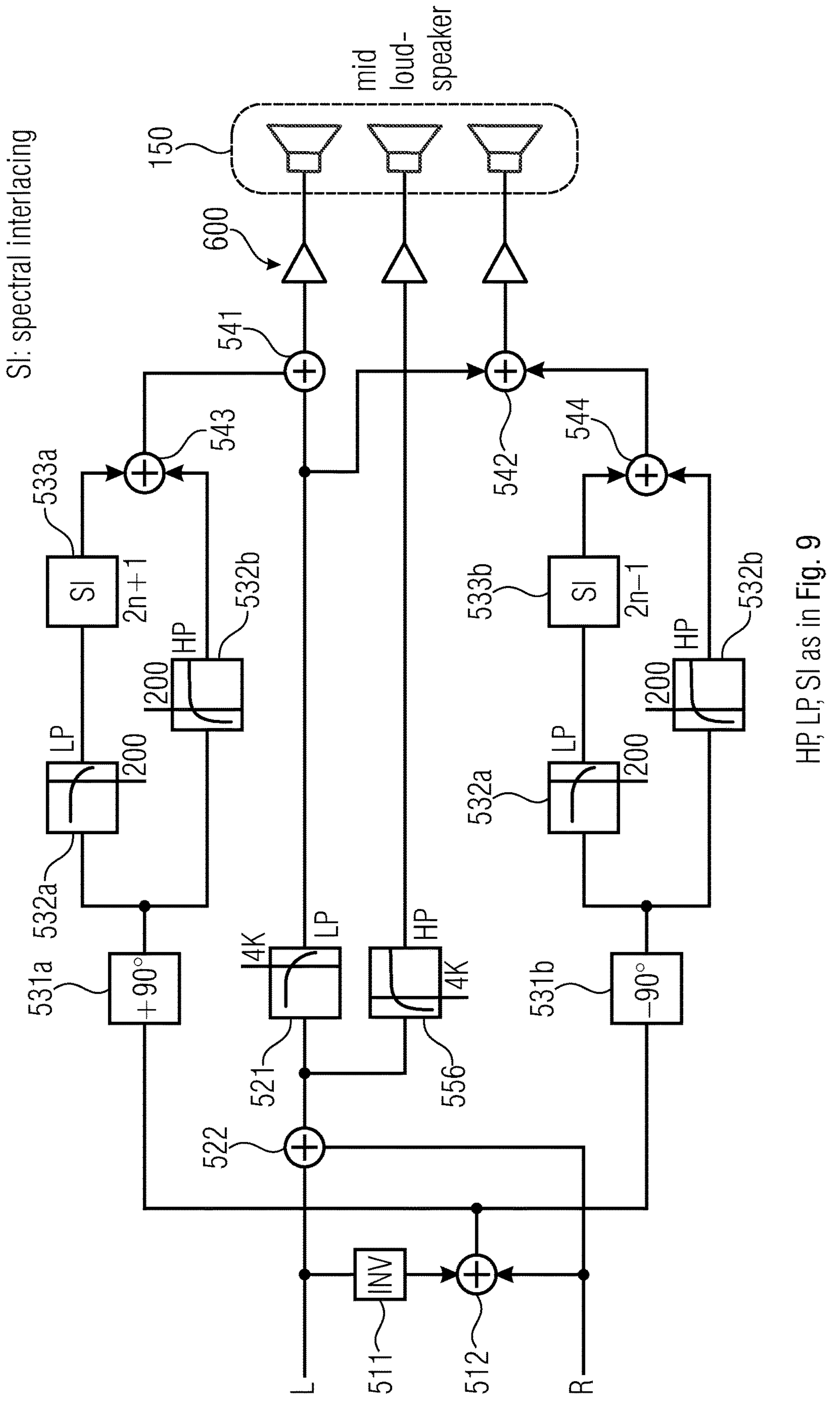
FIG. 10 shows an apparatus for generating control signals with an amplifier stage and the loudspeaker system for an installation as a center loudspeaker, or an apparatus for generating control signals, or algorithm, for the different loudspeakers each comprising two individual loudspeakers and a tweeter advantageously arranged therebetween.

FIG. 10 shows a similar implementation as shown in FIG. 9, however, now for the control of the center loudspeaker 150 of FIG. 2 or FIG. 4. To this end, in contrast to FIG. 9, the sum of the first channel signal L and the second channel signal R is formed by means of the adder 522, advantageously arranged in the common mode signal generator 520. This sum, or mono, signal is then supplied to the low-pass 521 of the common mode signal generator to obtain the common mode sum signal. On the other hand, the sum signal at the output of the adder 522 is high-pass filtered, i.e. by means of the high-pass filter 556 that is advantageously part of the tweeter signal generator 550, so as to obtain the third control signal. The differential mode generation by means of the differential mode signal generator 530 takes place in the same way as illustrated in FIG. 9.

In addition, the mixers 541, 542 corresponding to the adders 540*b* in FIG. 9 are illustrated. In addition, the adders 543, 544 are illustrated in FIG. 10 to obtain the complete differential mode signals, which correspond to the adders 540*a* in FIG. 9. All adder elements, i.e. 540*a* 540*b*, 541, 542, 543, 544, are advantageously elements of the mixer 540 of FIG. 6.

Figure 11:
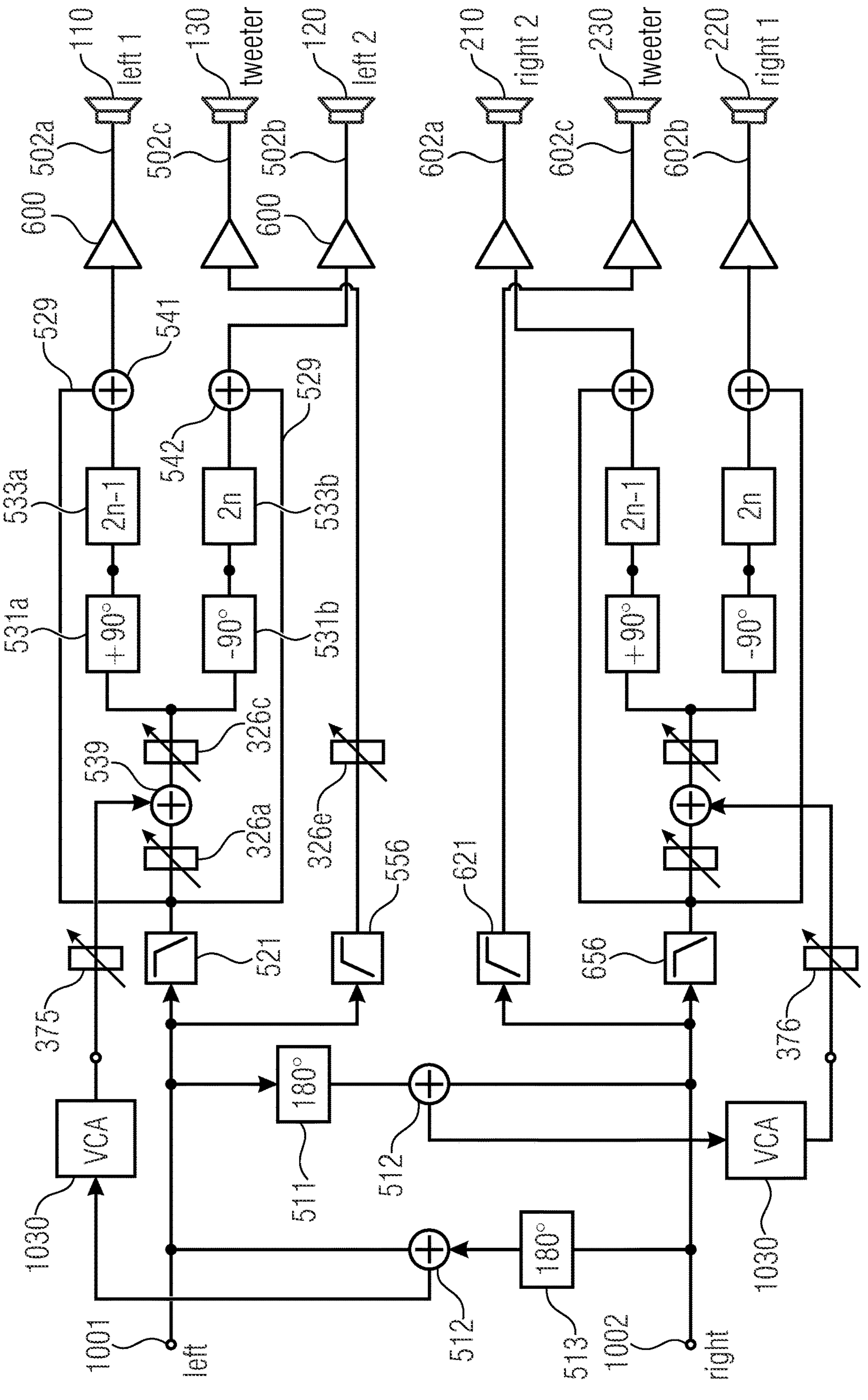
FIG. 11 shows a advantageous embodiment of the two control circuits for a first loudspeaker system for a left installation and a second loudspeaker system for a right installation with an additional closed-loop control of the base differential mode signal via a controlled amplifier, or a schematic illustration of an integrated and non-integrated implementation of the signal generation with a side signal generator as an example for a differential mode signal generator and interleaved band-passes in the different signal paths according to an embodiment for controlling loudspeaker modules of FIG. 2-5 or other loudspeaker modules with two transducers and advantageously one tweeter.

FIG. 11 shows an alternative implementation of the control circuit, additionally comprising the controllable amplifier 1030. In addition, in contrast to FIG. 9 or FIG. 10, FIG. 11 shows the situation for both loudspeaker systems, i.e. for the left loudspeaker system with the sound transducers 110, 120, 130 and for the right loudspeaker position with the loudspeakers 210, 220 230. Furthermore, the control signals for the sound transducers 110, 120, 130 are denoted with 502*a*, 502*b*, 502*c*, whereas the control signals for the loudspeaker system at the right reproduction position are illustrated with 602*a*, 602*b*, 602*c*.

In addition, in contrast to the illustrations at FIGS. 8*a*, 8*b*, 9 and 10, the generation of the one or several low-pass signals is not explicitly illustrated. The frequency filter 532 of FIGS. 8*a* and 8*b* is just not explicitly illustrated in FIG. 11. In addition, the base differential mode signal generator 510 is configured to amplify a raw differential mode signal at the output of the respective adder 512, i.e. by means of the controllable amplifier 1030. The output signal of the amplifier is attenuated by means of an attenuation member 375, or 376, also belonging to the base differential mode signal generator 510, according to the implementation, wherein the attenuation members 375, 376 can be adjusted differently so as to set the content of the raw differential mode signal in the actual base differential mode signal. In the embodiment shown in FIG. 11, the base differential mode signal does not "only" consist of the difference, but, due to the low-pass 521 of the common mode signal generator and the attenuation members 326*a*, 326*c*, it is further possible to mix in a certain proportion of the common mode signal to the raw differential mode signal so as to then obtain the base differential mode signal at the output of the attenuation member 326*c*, which is then used, by using the spectral interlacing means 533*a*, 533*b* and the upstream or downstream phase shifters 531*a*, 531*b* (in FIG. 11 they are only exemplarily connected upstream), to obtain the corresponding differential mode signal that is then added, by means of the mixers 541 and 542, to the corresponding common mode signal at the output of the low-pass 521, denoted with 529, to obtain the first control signal 502*a*, or the second control signal 502*b* (after a corresponding amplification by means of the amplifier 600).

The implementation for the right channel corresponds thereto, wherein the controllable amplifier 1030 whose output signal may be attenuated by means of the attenuator 376 and whose output signal may be mixed with a certain proportion of the common mode signal adjustable by means of the corresponding attenuator is here also provided.

In addition, the low-pass filter 656 as shown in FIG. 11, and the high-pass filter 621 for the tweeter signal generation are also provided in the second apparatus for generating control signals.

Figure 12:
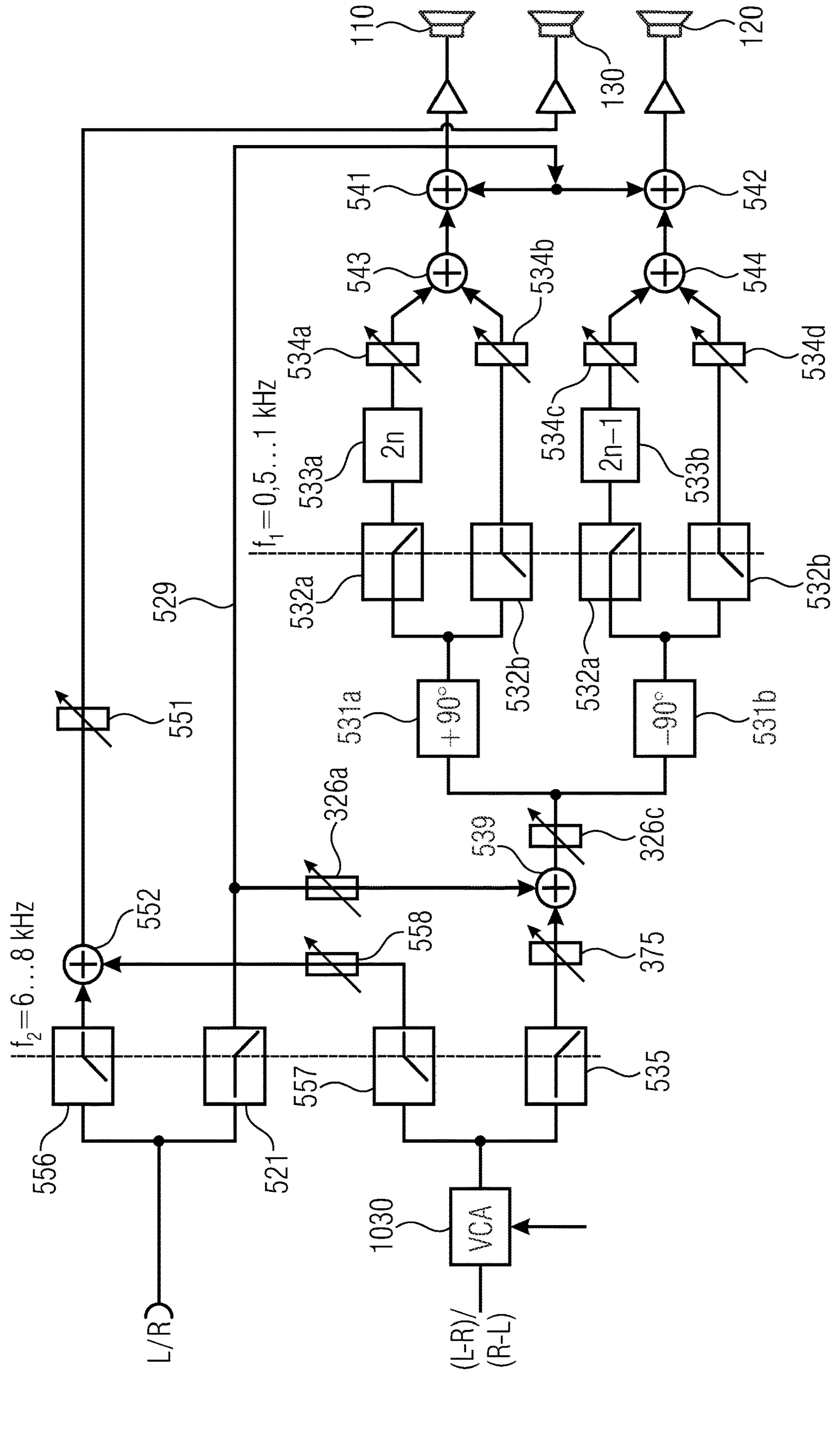
FIG. 12 shows an implementation of a loudspeaker system with a control circuit, a closed-loop controlled, or controlled, amplifier and an additional use of the high-pass portion of the differential signal for a tweeter control signal as well as spectral interlacing means only for the low-pass portion of the base differential mode signal, or a schematic illustration of an integrated or non-integrated implementation of the signal generation with a side signal generator as an example for a differential mode signal generator and interleaved band-passes in the different signal paths according to a further embodiment for controlling loudspeaker modules of FIG. 2-5 or other loudspeaker modules with two transducers and a tweeter.
Figure 13:
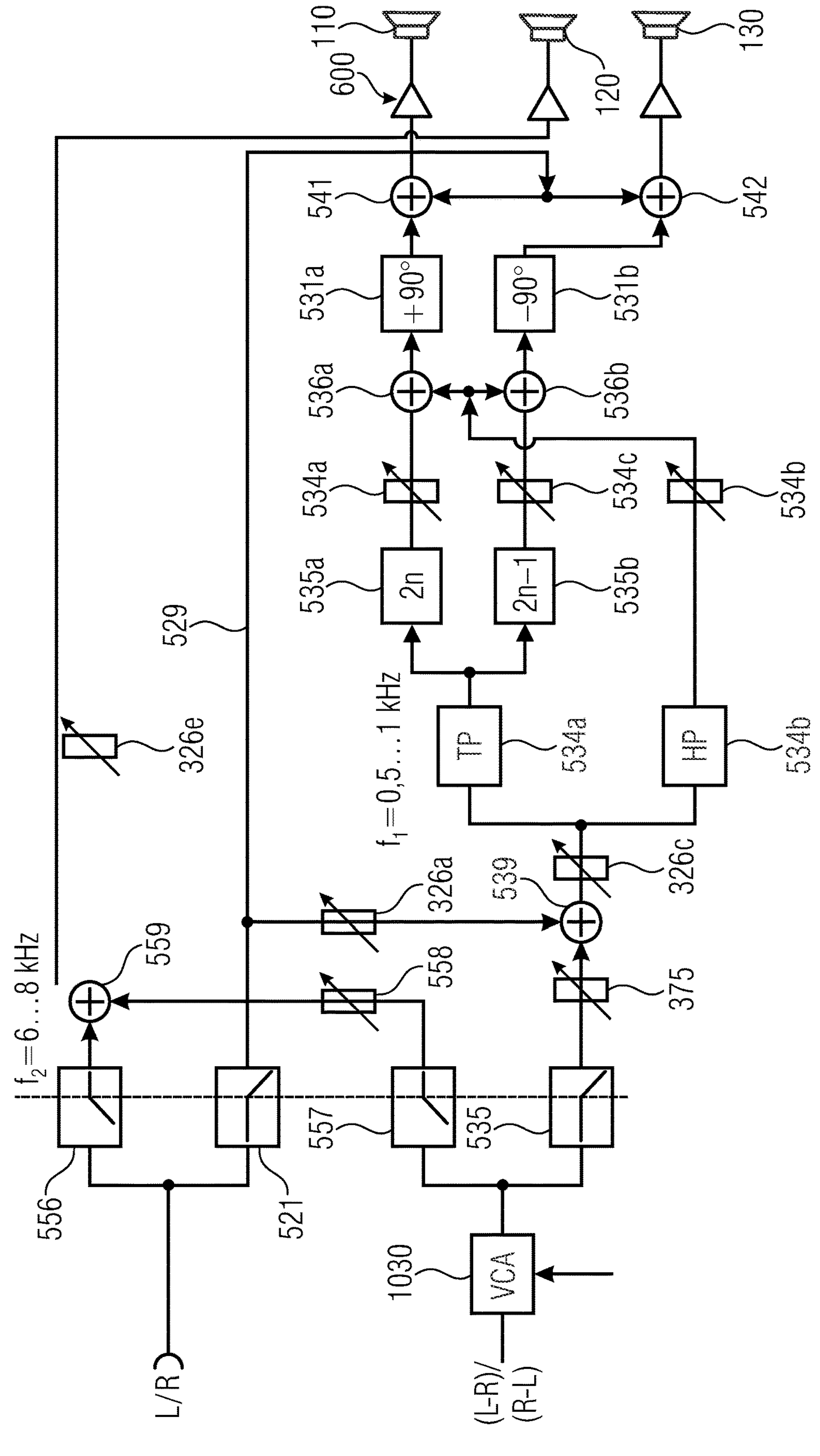
FIG. 13 shows an embodiment similar to that of FIG. 12, however, with the alternative implementation of the base differential mode signal generator according to the principle illustrated in FIG. 8*b*.
Figure 14:
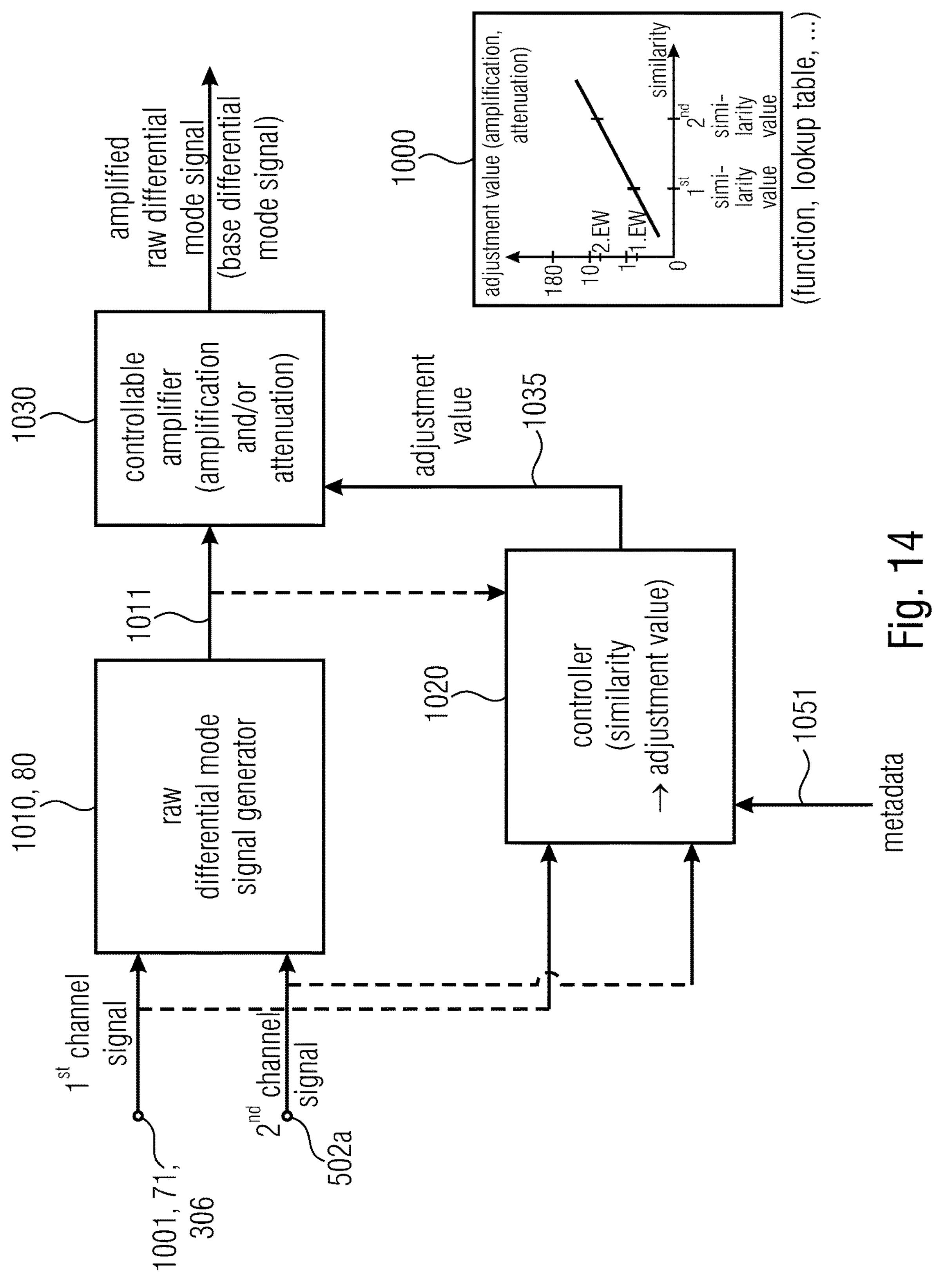
FIG. 14 shows a detailed illustration of the implementation of the controlled or close-loop controlled amplifier of FIGS. 11-13, depending on a similarity of the two channel signals, on a characteristic of the raw differential mode signal, or on externally supplied metadata.

FIG. 12 shows an alternative embodiment for implementing the control circuit. FIG. 12 illustrates the configuration of the differential mode signal generator 530 of FIG. 8, whereas the configuration of the differential mode signal generator of FIG. 8*b* is illustrated in FIG. 13.

In contrast to the previous illustrations, e.g. in FIG. 9 or FIG. 10, the differential mode signal generator includes corresponding attenuation members 534*a*, 534*b*, 534*c*, 534*d* so to be able to perform a weighted mix by means of the adders 543, 544 together with the corresponding attenuation members 534*a* to 534*d* to the extent that the proportions of the different ranges are weighted before they are mixed according to the embodiment in FIG. 11. In addition, an attenuation member is also provided at the input of the phase shifter means 531*a*, or 531*b* in FIG. 12, or the frequency filter means 534*a*, 534*b*. This attenuation member 326*c* is configured to attenuate the input signal, according to the implementation. In addition, in the embodiment shown in FIG. 12 and FIG. 13, similar to FIG. 11, the common mode signal is also mixed in to the differential mode signal after a corresponding attenuation by means of the attenuator 326*a*.

In addition, the high-pass member 557 and the low-pass member 535 are provided to accordingly process the raw signal already amplified by the amplifier 1030, i.e. to spectrally filter the same, so as to obtain the low-pass signal from which the base differential mode signal is calculated, and to obtain a high-pass signal that may be mixed to the corresponding tweeter signal, i.e. the high-pass content of the left, or right, channel signal, after a corresponding adjustable attenuation 558. Thus, the high-pass 556, the attenuation member 558, the high-pass 557, the adder 552, and the corresponding attenuation member 551 are used for the actual tweeter signal generation. If, in FIG. 12 or FIG. 13, the attenuation member 558 is set to a high attenuation, the implementation of FIG. 12 corresponds to the embodiment of FIG. 9 or FIG. 10 with respect to the tweeter control signal, i.e. the third control signal 502*c*. The same applies for the adjustment of the attenuation member 326*a* to a high attenuation. In this case, the channel signal is not mixed to the base differential mode signal, i.e. the adder 539 becomes meaningless, so that the base differential mode signal is solely based on the difference of the two channel signals. Mixing part of the differential signal to the tweeter signal so that the attenuator 558 lets pass through an attenuated version of the differential signal (in the treble range) is advantageous to the extent that it enables a good balance between the amplitude of the tweeter signal and the amplitude of the midrange speaker or woofer signal, or of the corresponding sound field of the two sound transducers generated in the air, so as to also consider for the treble range an additional amplitude in the mid or base range due to the addition of the correspondingly processed differential signal.

Alternatively, a level difference between the tweeter control signal and the entire level of the common mode and the differential mode may also be balanced by means of accordingly amplifying the tweeter signal, or accordingly attenuating both the common mode signal and the differential mode signal for the corresponding sound transducer. In any case, it is advantageous for the amplitudes to be balanced, even though there is no differential mode in the treble range, but there is a corresponding differential mode in the midrange or base range. In embodiments, the midrange speaker or woofer may be configured as a combined transducer that covers both the midrange and the base range. Alternatively, two different transducers may be provided for the midrange and the base range to the extent that the corresponding control signal is of a broadband nature, and then runs over crossover before it reaches the corresponding loudspeakers.

FIG. 2 shows an apparatus for generating a control signal for a sound transducer, said apparatus comprising a differential mode signal generator 1010, 80, a control amplifier 1030, and a controller 1020. The differential mode signal generator 1010, 80 is configured to generate a differential mode signal 1011 from a first channel signal and from a second channel signal. The first channel signal 1001, or 71, or 306, and the second channel signal 1002, or 308, originate from a multi-channel audio signal and may be the left channel signal and the right channel signal, for example. Alternatively, the first channel signal may also be a left rear channel (left surround) or a right rear channel (right surround) or any other channel of a multi-channel audio signal that may not only comprise a 5.1 format, but also higher formats such as a 7.1 format, etc.

The controllable amplifier 1030 is configured to amplify or attenuate the differential mode signal 1011, i.e. with an adjustable amplification or attenuation according to an adjustment value 1035 that the controllable receiver 1030 receives from the controller 1020. In particular, the apparatus in FIG. 2 is configured to use the amplified differential mode signal 1036, or 72, as a basis for the control signal for one or several sound transducers, wherein different variations for generating the final control signal from the amplified differential mode signal are subsequently described with respect to FIG. 5*b*, 7*a*, 7*b*, 8*a*, 8*b*, 11, 12, 13, 14, 15*a*, 15*b* or 16.

The controller 1020 is configured to determine the adjustment value 1035 such that a first adjustment value is determined in case of a first similarity between the first channel signal and the second channel signal, and such that a second adjustment value is determined in case of a second similarity between the first channel signal and second channel signal, wherein the first similarity particularly represents a lower similarity than the second similarity, and wherein the first adjustment value represents a smaller amplification than the second adjustment value or a larger attenuation than the second adjustment value. This connection is schematically illustrated in the mapping function 1000, representing an adjustment value for an amplification (adjustment value larger than 1) and/or for an attenuation (adjustment value smaller than 1), i.e. depending on a similarity scale. In particular, the amplification becomes larger and larger for larger similarity values, i.e. for greater similarities between the first channel signal and second channel signal. This is advantageous to the extent that the level loss of the differential mode signal advantageously generated as a differential signal or an approximate differential signal is balanced, or partially compensated through this. On the other hand, the amplification becomes smaller and smaller the more dissimilar the two channels signals are, since the level of the differential signal decreases and decreases. In particular, a special situation arise if the first channel signal and the second channel signal are particularly dissimilar, i.e. fully correlated, but inversely phased. Then, the calculation of the differential mode signal leads to an superelevation of the level of the differential mode signal, which, according to the mapping function to map similarity values to adjustment values, as schematically illustrated at 1000 in FIG. 2, is addressed according to the invention to the extent that the differential mode signal is amplified less or is even attenuated, i.e. with an amplification factor of less than one in a linear scale, or with a negative amplification factor in a logarithmic scale, such as a dB scale.

An amplification may be an amplification that leads to an increase of the level, i.e. an amplification with an amplification factor of larger than 1, or a positive amplification factor on a dB scale. However, an amplification may also be an amplification with an amplification factor of less than 1, i.e. an attenuation. Then, the amplification factor is between 0.1, or within the negative range on a dB scale.

Depending on the embodiment, a direct analysis of the signals to obtain the adjustment value takes place in the apparatus of FIG. 2. Alternatively, the multi-channel audio signal including the first channel signal 1001, 71, 306 and the second channel signal 1002, 308 includes metadata 1050 illustrated in FIG. 17. The controller 1020 is configured to extract the adjustment value 1035, 1051 from the metadata 1050. The controllable amplifier is configured to apply the adjustable amplification or attenuation to the differential mode signal 1011 according to the extracted adjustment value. This is illustrated by means of the arrow into block 1020 for the metadata at 1051. Then, a direct signal analysis does not necessarily take place in the apparatus of FIG. 2. In a mixed implementation, a starting value for the adjustment value is read out from the metadata 1051, said starting value may then be fine-tuned by means of an apparatus configured for the actual signal analysis. On the other hand, an apparatus that may not carry out signal analysis, but that may only read out the metadata 1051, may use for an entire piece the same starting value, which already represents an improvement, or it may use this new adjustment value for adjusting the controllable amplifier(s) at certain points in time within a piece at which a new adjustment value is again available in the metadata.

Advantageously, the controller 1020 is configured to determine a correlation value between the first channel signal 1001, 71, 306 and second channel signal 1002, 308, wherein the correlation value is a measurement for the similarity. Particularly advantageously, the controller 1020 is configured to calculate a normalized cross-correlation function from the first channel signal and second channel signal, wherein the value of the normalized cross-correlation function is a measurement for the similarity. In particular, the controller 1020 is configured to calculate a correlation value by using a correlation function that has a value range of negative or positive values, wherein the controller is configured to determine for a negative value of the correlation function an adjustment value that represents an attenuation or amplification, and to determine for a positive value of the correlation function the adjustment value that represents an amplification, or attenuation, i.e. the other one. A typical normalized cross-correlation function has a value range of between −1 and +1, wherein the value of −1 signifies that the two signals are fully correlated but reverse in phase, and are therefore, as dissimilar as possible.

On the other hand, a value of +1 is obtained if the two channel signals are fully correlated and of the same phase, i.e. are as similar as possible. The differential mode signal becomes larger and larger with a decreasing value of −1 to 0 in case of a normalized cross-correlation function, which is why the amplification factor in this range is decreased further and further. In case of a value of the normalized cross-correlation function being between 0 and −1, the similarity becomes less and less, which is why the differential mode signal is attenuated more and more, or is amplified less and less, so as to counteract the superelevation of the differential mode signal. Thus, a similarity between the channel signals is synchronized with the cross-correlation function only if the two channel signals are of the same phase, i.e. if the sign of the cross-correlation function is +1. On the other hand, the similarity runs counter to the value of the cross-correlation function if the sign of the cross-correlation function is negative.

A advantageous embodiment of the present invention is located within a mobile device, such as a mobile telephone, a tablet, a notebook, etc. In particular, the control apparatus, or the apparatus for generating a control signal, is loaded as a hardware element or as an app, or a program, on the mobile telephone, the mobile telephone is configured to be able to receive from any source, which may be local or in the internet, the first audio signal, the second audio signal or the multi-channel signal and to generate depending thereon the control signals. These signals are transferred from the mobile telephone to the sound transducer with the sound transducer elements either by means of a cable or a wireless, e.g. by means of Bluetooth or Wi-Fi. In the latter case, it is required that the sound generator elements comprise a battery supply, or a power supply in general, to achieve corresponding amplification of the wireless signals received, e.g. according to the Bluetooth format or according to the Wi-Fi format.

An apparatus for generating control signals for a sound generator therefore includes the differential mode signal generator for generating a differential mode signal from a first channel signal and a second channel signal of a multi-channel audio signal, and a common mode signal generator for generating a first common mode signal from the first channel signal and a second common mode signal from a second channel signal, wherein the apparatus is configured to generate one or several control signals for one or several midrange or bass transducers of the sound generator by using the first common mode signal and the second common mode signal and by using the differential mode signal, and wherein the apparatus is configured to generate a further control signal for a tweeter of the sound generator by using the first common mode signal or the second common mode signal and by using the differential mode signal, or wherein the apparatus is configured to use, when generating the control signals in a bass range, band-selective processing, to use, when generating the control signals in a midrange, the differential mode signal and the common mode signal for controlling one or several midrange or bass transducers of the sound generator (e.g. without band-selective processing), and to control a single tweeter of the sound generator with a combination of the common mode signal and the differential mode signal.

A sound generator includes one or two transducers for a bass range or a midrange, and a tweeter, wherein, e.g., the one or two transducers are arranged to be deflected in a plane perpendicular to a base, and wherein, e.g., the tweeter is configured to be deflected perpendicularly to a base, or wherein, e.g., the one or the two transducers are arranged to be deflected in a plane perpendicular to a surface normal of a front side of the sound generator, and wherein the tweeter is configured to be deflected perpendicularly to the deflection of the two transducers.

A loudspeaker configuration for an instrument panel or a rear shelf in a vehicle includes an above-mentioned sound generator at a left position, an above-mentioned sound generator at a center position, and an above-mentioned sound generator at a right position, or a sound generator with a transducer at a left position, an above-mentioned sound generator at a center position, and a sound generator with a transducer at a right position, or an above-mentioned sound generator at a left position and an above-mentioned sound generator at a right position, or an above-mentioned sound generator at a left position, a sound generator with a transducer at a center position, and an above-mentioned sound generator at a right position.

In a further embodiment of the present invention, when a multi-signal is available, e.g. as a stereo signal or as a signal with three or more channels, the control signals are derived from this multi-channel representation. In case of a stereo signal, e.g., a side signal representing the difference of the left and the right channel is calculated, this side signal then possibly being attenuated or amplified accordingly, and, depending on the implementation, being mixed with a non-high-pass filtered or a high-pass filtered common mode signal. If the output signal has several channels, the mix signals may be generated from differences between any two channels of the multi-channel representation. Thus, e.g., a difference between the left and the right rear (right surround) may be generated, or alternatively, a difference between the center channel and any one of the other four channels of a five-channel representation. In case of such a five-channel representation, however, as is the case in a stereo representation, a difference between left and right may be determined to generate the side signal. In a further embodiment, certain channels of the five-channel representation may be added, i.e. a two-channel down mix may be determined. An exemplary implementation for generating a two-channel down mix signal consists of adding, possibly with weighting factors, left rear (left surround), left, and center, to generate a left down mix channel. To generate the right down mix channel, the right rear channel (right surround) is added with the right channel and the center channel, possibly again with weighting factors. The mix signal may then be determined on the basis of a difference formation from the left down mix channel and the right down mix channel.

Subsequently, Advantageous Embodiments of the Present Invention are Listed:

1. An apparatus for generating control signals for a sound generator, comprising:
   - a differential mode signal generator for generating a differential mode signal from a first channel signal and a second channel signal of a multi-channel audio signal,
   - a common mode signal generator for generating a first common mode signal from the first channel signal and a second common mode signal from a second channel signal,
   - wherein the apparatus is configured to generate one or several control signals for one or several midrange or bass transducers of the sound generator by using the first common mode signal and the second common mode signal and by using the differential mode signal, and wherein the apparatus is configured to generate a further control signal for a tweeter of the sound generator by using the first common mode signal or the second common mode signal and by using the differential mode signal, or
   - wherein the apparatus is configured to use, when generating the control signals in a bass range, band-selective processing, to use, when generating the control signals in a midrange, the differential mode signal and the common mode signal for controlling one or several midrange or bass transducers of the sound generator (e.g. without band-selective processing), and to control a single tweeter of the sound generator with a combination of the common mode signal and the differential mode signal.
2. The apparatus according to example 1, comprising
   - a controllable amplifier (1020) for amplifying or attenuating the differential mode signal (1011) with an adjustable amplification or attenuation according to an adjustment value, wherein the apparatus is configured to determine the control signal from an output signal (1036) of the controllable amplifier (1030); and
   - a controller (1020) for determining the adjustment value, wherein the controller (1020) is configured to determine a first adjustment value in case of a first similarity between the first channel signal and the second channel signal, and to determine a second adjustment value in case of a second similarity between the first channel signal and the second channel signal, wherein the first similarity represents a lower similarity than the second similarity, and wherein the first adjustment value represents a smaller amplification than the second adjustment value or a larger attenuation than the second adjustment value, or
   - wherein the controller (1020) is configured to determine a correlation value between the first channel signal and the second channel signal, wherein the correlation value is a measurement for the similarity.
3. The apparatus according to example 2, wherein the controller (1020) is configured to calculate a normalized cross-correlation function from the first channel signal and the second channel signal, wherein a value of the normalized cross-correlation function is a measurement of the similarity.
4. The apparatus according to any of the preceding examples 2 to 3, wherein the controller (1020) is configured to calculate a similarity value using a correlation function having a value range of negative and positive values, wherein the controller (1020) is configured to determine for a negative value of the cross-correlation function the adjustment value that either represents an attenuation or an amplification, and to determine for a positive value of the correlation function the adjustment value that represents the respectively other one of the amplification or the attenuation.
5. The apparatus according to any of examples 2 to 4, wherein the controller (1020) is configured to determine the adjustment value for a correlation value of 0 such that an amplification corresponding to the adjustment value comprises an amplification factor of between 0.9 and 1.1.
6. Apparatus according to any of the preceding examples 2 to 5, wherein the controller is configured to calculate a quantitative similarity value that is within a value range of possible similarity values, and to determine from the quantitative similarity value the adjustment value according to a mapping function (1000), wherein the mapping function (1000) is monotonous so that an adjustment value providing a smaller amplification is determined for a similarity value representing a lower similarity than for an adjustment value representing a higher similarity.
7. The apparatus according to any of the preceding examples 2 to 6, wherein the controllable amplifier (1030) comprises an amplification range that extends between at least −6 dB and at least +6 dB, and wherein the controller (1020) is configured to map a value range for a quantitative similarity value to the amplification range (1000), or
   - wherein the controller (1020) is further configured to deliver, for similarity values that at least indicate a similarity of 90% of the first channel signal and a second channel signal, an adjustment value at which the common mode signal (1011) is amplified with a reduced amplification, compared to an amplification at a lower similarity than the 90% identity between the first channel signal and the second channel signal.

8. The apparatus according to any of the preceding examples 2 to 7, wherein the controller (1020) is configured to analyze the differential mode signal (1011), and to determine the first adjustment value in case of a first amplitude-related quantity of the differential mode signal (1011), and to determine the second adjustment value in case of a second amplitude-related quantity of the differential mode signal (1011), wherein the first amplitude-related quantity is larger than the second amplitude-related quantity.

9. An apparatus according to any of the preceding examples, wherein the differential mode signal generator (1010, 80) is configured to determine the differential mode signal by forming a difference between the first channel signal and the second channel signal.

10. The apparatus according to any of the preceding examples 2 to 9, wherein a multi-channel audio signal comprises the first channel signal and the second channel signal, wherein the differential mode signal generator is configured to generate the differential mode signal (1011) and a further differential mode signal (1012) different from the differential mode signal (1011), wherein a further controllable amplifier (1032) is configured to amplify the further differential mode signal (1012), wherein the controller is configured to provide to the further controllable amplifier (1032) an adjustment value that causes a same amplification or attenuation of the further differential mode signal (1012) in comparison to the amplification or attenuation of the differential mode signal (1011).

11. An apparatus according to any of the preceding examples, wherein a cutoff frequency between the bass range and the midrange is between 0.3 kHz and 1.2 kHz and advantageously between 0.5 kHz and 1 kHz, or wherein a cutoff frequency between the midrange and the treble range is between 5 and 9 kHz and advantageously between 6 kHz and 8 kHz.

12. Apparatus according to any of the preceding examples, wherein the controller (1020) is configured to determine the adjustment value from the first channel signal and the second channel, and to filter the first channel signal of the second channel signal with a high-pass filter or a bandpass filter, and to identify determine the adjustment value from a filtered first channel signal and a second filtered channel signal, or wherein the controller (1020) is configured to filter the differential mode signal (1011) with a high-pass filter or a bandpass filter, and to determine the adjustment value from a filtered differential mode signal.

13. The apparatus according to example 12, wherein the high-pass filter or the bandpass filter comprises a lower cutoff frequency of between 50 Hz and 200 Hz, or wherein the bandpass filter comprises an upper cutoff frequency of between 2 kHz and 8 kHz.

14. An apparatus according to any of the preceding examples, wherein the multi-channel audio signal is an audio piece, and wherein the controller (1020) is configured to generate an adjustment value for the audio piece by means of an analysis of the audio piece prior to generating the control signal, or wherein the controller (1020) is configured to determine the adjustment value in a variable manner across time for the multi-channel audio signal on the basis of a start value, wherein the controller (1020) is configured to determine the adjustment value on the basis of a temporal range of the multi-channel audio signal extending prior to a current point in time or after a current point in time, wherein the range prior to the current point in time or the range after the current point in time includes a time span that is between 1 ms and 15 s, or wherein the range includes an entire piece.

15. An apparatus according to any of the preceding examples, wherein the multi-channel audio signal including the first channel signal and the second channel signal includes metadata (1050) that includes the adjustment value (1051), wherein the controller is further configured to extract the adjustment value (1051) from the metadata (1050), and wherein the controllable amplifier is configured to apply the adjustable amplification or attenuation to the differential mode signal (1011) according to the extracted adjustment value.

16. A sound generator having two transducers for a bass range or a midrange and a tweeter, wherein, e.g., the two transducers are arranged to be deflected in a plane perpendicular to a basis, and wherein, e.g., the tweeter is configured to be deflected perpendicularly to a base, or wherein, e.g., the two transducers are arranged to be deflected in a plane perpendicular to a surface normal of a front side of the sound generator, and wherein, e.g., the tweeter is configured to be deflected perpendicularly to the deflection of the two transducers.

17. A loudspeaker configuration for an instrument panel or a rear shelf in a vehicle, comprising:

a sound generator according to example 16 at a left position, a sound generator according to example 16 at a center position, and a sound generator according to claim 16 at a right position, or a sound generator with a transducer at a left position, a sound generator according to example 16 at a center position, and a sound generator with a transducer at a right position, or a sound generator according to example 16 at a left position, and a sound generator according to example 16 at a right position, or a sound generator according to example 16 at a left position, a sound generator having a transducer at a center position, and a sound generator according to example 16 at a right position.

18. An apparatus for supplying sound optionally according to any of the preceding examples, comprising a left loudspeaker group, a center loudspeaker group, or a right loudspeaker group in the driving direction in front of a driver, e.g., between a windshield and an instrument panel, wherein one or several of the loudspeaker groups comprise a first and a second single loudspeaker and optionally comprises a tweeter between the two single loudspeakers; and means for generating a first control signal for a first single loudspeaker from a first channel signal, and a second control signal for a second single loudspeaker of the same loudspeaker group from a second channel signal, and a third control signal for the tweeter of the loudspeaker group from the first and/or the second channel signal, wherein the means is configured to derive the third control signal by means of high-pass filtering from the first or the second channel signal, respectively, or use, for the first or second channel signal, respectively, spectral interlacing for a differential signal only in a lower frequency range and not in an upper frequency range, or supply the same direct signal to both single loudspeakers of a group and to supply a signal each that is phase-shifted between 90 degrees and 270 degrees as an indirect signal, or add the first and the second channel signal for a supply of the central loudspeaker group, or low-pass filter the first or second channel signal, respectively, to generate the direct signal.

19. A method for generating a control signal for a sound generator, comprising:

for generating a differential mode signal (1011) from a first channel signal and a second channel signal of a multi-channel audio signal, generating a first common mode signal from the first channel signal and a second common mode signal from a second channel signal, wherein the method is configured to generate one or several control signals for one or several midrange or bass transducers of the sound generator by using the first common mode signal and the second common mode signal and by using the differential mode signal, and wherein the method is configured to generate a further control signal for a tweeter of the sound generator by using the first common mode signal or the second common mode signal and by using the differential mode signal, or wherein the method is configured to use, when generating the control signals in a bass range, band-selective processing (320*a, b, c*, 340*a, b*), to use, when generating the control signals in a midrange, the differential mode signal and the common mode signal for controlling one or several midrange or bass transducers of the sound generator (e.g. without band-selective processing), and to control a single tweeter of the sound generator with a combination of the common mode signal and the differential mode signal.

20. A computer program for performing the method according to example 19 when the method runs on a computer or a processor.

Even though some aspects have been described within the context of a device, it is understood that said aspects also represent a description of the corresponding method, so that a block or a structural component of a device is also to be understood as a corresponding method step or as a feature of a method step. By analogy therewith, aspects that have been described within the context of or as a method step also represent a description of a corresponding block or detail or feature of a corresponding device. Some or all of the method steps may be performed while using a hardware device, such as a microprocessor, a programmable computer or an electronic circuit. In some embodiments, some or several of the most important method steps may be performed by such a device.

Depending on specific implementation requirements, embodiments of the invention may be implemented in hardware or in software. Implementation may be effected while using a digital storage medium, for example a floppy disc, a DVD, a Blu-ray disc, a CD, a ROM, a PROM, an EPROM, an EEPROM or a FLASH memory, a hard disc or any other magnetic or optical memory which has electronically readable control signals stored thereon which may cooperate, or cooperate, with a programmable computer system such that the respective method is performed. This is why the digital storage medium may be computer-readable. Some embodiments in accordance with the invention thus comprise a data carrier which comprises electronically readable control signals that are capable of cooperating with a programmable computer system such that any of the methods described herein is performed. Generally, embodiments of the present invention may be implemented as a computer program product having a program code, the program code being effective to perform any of the methods when the computer program product runs on a computer. The program code may also be stored on a machine-readable carrier, for example. Other embodiments include the computer program for performing any of the methods described herein, said computer program being stored on a machine-readable carrier. In other words, an embodiment of the inventive method thus is a computer program which has a program code for performing any of the methods described herein, when the computer program runs on a computer. A further embodiment of the inventive methods thus is a data carrier (or a digital storage medium or a computer-readable medium) on which the computer program for performing any of the methods described herein is recorded. The data carrier, the digital storage medium, or the recorded medium are typically tangible, or non-volatile. A further embodiment of the inventive method thus is a data stream or a sequence of signals representing the computer program for performing any of the methods described herein. The data stream or the sequence of signals may be configured, for example, to be transmitted via a data communication link, for example via the internet. A further embodiment includes a processing unit, for example a computer or a programmable logic device, configured or adapted to perform any of the methods described herein. A further embodiment includes a computer on which the computer program for performing any of the methods described herein is installed.

A further embodiment in accordance with the invention includes a device or a system configured to transmit a computer program for performing at least one of the methods described herein to a receiver. The transmission may be electronic or optical, for example. The receiver may be a computer, a mobile device, a memory device or a similar device, for example. The device or the system may include a file server for transmitting the computer program to the receiver, for example. In some embodiments, a programmable logic device (for example a field-programmable gate array, an FPGA) may be used for performing some or all of the functionalities of the methods described herein. In some embodiments, a field-programmable gate array may cooperate with a microprocessor to perform any of the methods described herein. Generally, the methods are performed, in some embodiments, by any hardware device. Said hardware device may be any universally applicable hardware such as a computer processor (CPU), or may be a hardware specific to the method, such as an ASIC.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. An apparatus for generating control signals for a loudspeaker system with two sound generators, comprising:
- a first input configured for a first channel signal of a multi-channel audio signal;
- a second input configured for a second channel signal of the multi-channel audio signal;
- a first output configured for a first control signal for a first sound generator;
- a second output configured for a second control signal for a second sound generator;
- a base differential mode signal generator configured for forming a base differential mode signal from the first channel signal and the second channel signal;
- a differential mode signal generator configured for generating a first differential mode signal and a second differential mode signal from the base differential mode signal, wherein the first differential mode signal is phase-shifted with respect to the second differential mode signal; and
- a mixer configured for mixing a common mode signal with the first differential mode signal so as to acquire the first control signal, and for mixing the common mode signal with the second differential mode signal so as to acquire the second control signal,
- wherein the differential mode signal generator comprises:
  - a frequency filter configured for receiving the base differential mode signal as one input signal or configured for receiving a first phase shifted signal and a second phase shifted signal derived from the base differential mode signal as several input signals and configured for generating one low-pass signal or several low-pass signals from the one input signal or the several input signals received by the frequency filter; and
  - a spectral interlacer configured for spectrally filtering the one low-pass signal or a first low-pass signal of the several low-pass signals in a first manner so as to acquire a first filtered signal, and configured for spectrally filtering the one low-pass signal or a second low-pass signal of the several low-pass signals in a second manner so as to acquire a second filtered signal that differs from the first filtered signal, and
- wherein the differential mode signal generator is configured to use the first filtered signal as the first differential mode signal or to derive the first differential mode signal from the first filtered signal, or wherein the differential mode signal generator is configured to use the second filtered signal as the second differential mode signal or to derive the second differential mode signal from the second filtered signal.

2. The apparatus according to claim 1, wherein the loudspeaker system comprises a tweeter, and comprising:
- a third output configured for a third control signal for the tweeter; and
- a tweeter signal generator configured for generating the third control signal from the first channel signal or the second channel signal.

3. The apparatus according to claim 2, wherein the tweeter signal generator comprises a high-pass filter.

4. The apparatus according to claim 3, wherein a cutoff frequency of the high-pass filter of the tweeter signal generator is between 3 kHz and 5 kHz.

5. The apparatus according to claim 2, provided for a first reproduction position for the first channel signal,
- wherein the common mode signal generator is configured to generate the common mode signal by using the first channel signal and without using the second channel signal, and wherein the tweeter signal generator is configured to determine the third control signal by using the first channel signal and without using the second channel signal.

6. The apparatus according to claim 2, provided for a second reproduction position for the second channel signal,
- wherein the common mode signal generator is configured to generate the common mode signal by using the second channel signal without using the first channel signal, and
- wherein the tweeter signal generator is configured to determine the third control signal by using the second channel signal without using the first channel signal.

7. The apparatus according to claim 2, configured for a third reproduction position between a first reproduction position for the first channel signal and a second reproduction position for the second channel signal, wherein the common mode signal generator is configured to generate the common mode signal by using a combination of the first channel signal and the second channel signal, and
- wherein the tweeter signal generator is configured to determine the third control signal by using a combination of the first channel signal and the second channel signal.

8. The apparatus according to claim 2, wherein the tweeter signal generator is configured to generate the third control signal additionally by using a combination with the base differential mode signal.

9. The apparatus according to claim 1, comprising:
- a common mode signal generator configured for generating the common mode signal from the first channel signal or the second channel signal for the first control signal and the second control signal.

10. The apparatus according to claim 9, wherein the common mode signal generator comprises a low-pass filter.

11. The apparatus according to claim 10, wherein a cutoff frequency of the low-pass filter is between 3 kHz and 5 KHz.

12. The apparatus according to claim 1, comprising:
- wherein the frequency filter is configured to generate one or several high-pass signals from the input signal or the several input signals in received by the frequency filter, and
- wherein the differential mode signal generator is configured to derive the first differential mode signal from the first filtered signal by using the one high-pass signal or a first high-pass signal of the several high-pass signals, and to derive the second differential mode signal from the second filtered signal by using the one high-pass signal or a second high-pass signal of the several high-pass signals.

13. The apparatus according to claim 1, wherein the differential mode signal generator is configured to generate the first differential mode signal and the second differential mode signal with a phase shift that is between 100° and 260°, wherein the first differential mode signal comprises a phase shift of between +45° and +135° with respect to the base differential mode signal, and wherein the second differential mode signal comprises a phase shift of between −45° and −135° with respect to the base differential mode signal.

14. The apparatus according to claim 1, wherein the differential mode signal generator comprises:

a phase shifter configured for phase shifting the base differential mode signal by a first phase value so as to acquire the first phase-shifted signal, and by a second phase value so as to acquire the second phase-shifted signal, wherein the second phase value differs from the first phase value;

the frequency filter configured for generating the first low-pass signal from the first phase-shifted signal and configured for generating the second low-pass signal from the second phase-shifted signal;

wherein the spectral interlacer is configured for spectrally filtering the first low-pass signal and for spectrally filtering the second low-pass signal, and wherein the mixer is configured to determine the first control signal from the first filtered signal and the common mode signal, and wherein the mixer is configured to determine the second control signal from the second filtered signal and the common mode signal.

15. The apparatus according to claim 14, wherein the frequency filter is configured for generating the first low-pass signal and a first high-pass signal from the first phase-shifted signal and for generating the second low-pass signal and a second high-pass signal from the second phase-shifted signal, and wherein the mixer is configured to determine the first control signal from the first high-pass signal, the first filtered signal, and the common mode signal, and wherein the mixer is configured to determine the second control signal from the second high-pass signal, the second filtered signal, and the common mode signal.

16. The apparatus according to claim 1, wherein the frequency filter is configured for generating the one low-pass signal from the base differential mode signal;

wherein the spectral interlacer is configured for spectrally filtering the one low-pass signal in a first manner so as to acquire the first filtered signal, and for spectrally filtering the one low-pass signal in a second manner so as to acquire the second filtered signal; and wherein the differential mode signal generator comprises:

a phase shifter configured for phase shifting the first filtered signal or a signal derived from the first filtered signal by a first phase value so as to acquire the first differential mode signal, and configured for phase shifting the second filtered signal or a signal derived from the second filtered signal by a second phase value so as to acquire the second differential mode signal, wherein the second phase value differs from the first phase value.

17. The apparatus according to claim 16, wherein the frequency filter is configured for generating the one high-pass signal and a low-pass signal from the base differential mode signal; and wherein the differential mode signal generator comprises:

a combiner configured for combining the first filtered signal with the first high-pass signal so as to acquire a first combination signal, and configured for combining the second filtered signal with the first high-pass signal so as to acquire a second combination signal, wherein the first combination signal is the signal derived from the first filtered signal, and wherein the second combination signal is the signal derived from the second filtered signal; and wherein the phase shifter is configured for phase shifting the first combination signal by the first phase value so as to acquire the first differential mode signal, and wherein the phase shifter is configured for phase shifting the second combination signal by the second phase value so as to acquire the second differential mode signal.

18. The apparatus according to claim 1, wherein the spectral interlacer is configured to, when processing in the first manner, use one first or several first bandpass filters and, when processing in the second manner, use one or several second bandpass filters, wherein the one first or the several first bandpass filters and the one or the several second bandpass filters are configured such that the one first or the several first bandpass filters have a passthrough range in a frequency range, and the second or the several second bandpass filters have a blocking range or several blocking ranges in the frequency range.

19. The apparatus according to claim 1, wherein the spectral interlacer comprises a first low-pass filter configured for filtering an input signal of the spectral interlacer in the first manner, and a second high-pass filter or bandpass filter configured for filtering the input signal of the spectral interlacer in the second manner, wherein a blocking range of the first low-pass filter overlaps a passthrough range of the second high-pass filter or bandpass filter with respect to a frequency.

20. The apparatus according to claim 19, wherein the spectral interlacer comprises a third bandpass filter configured for filtering in the first manner, and comprises the first bandpass filter configured for filtering the input signal in the first manner, wherein a passthrough range of the third high-pass filter or the bandpass filter overlaps with a blocking range of the first bandpass filter.

21. The apparatus according to claim 20, wherein the spectral interlacer comprises a third bandpass filter configured for filtering in the first manner, and comprises a fourth high-pass filter configured for a fourth bandpass filter configured for filtering in the second manner, wherein a pass through range of the fourth bandpass filter overlaps with a blocking range of the third bandpass filter.

22. The apparatus according to claim 1, wherein the frequency filter comprises a high-pass filter and a low-pass filter.

23. The apparatus according to claim 22, wherein a cutoff frequency of the high-pass filter is between 150 Hz and 500 Hz, or a cutoff frequency of the low-pass filter is between 150 Hz and 500 Hz.

24. The apparatus according to claim 1, wherein the base differential mode signal generator comprises:

a controllable amplifier configured for amplifying or attenuating a raw signal determined from the first channel signal and the second channel signal, according to an adjustment value, so as to acquire the base differential mode signal; and a controller configured for controlling the controllable amplifier on the basis of the first channel signal and the second channel signal, on the basis of the raw signal, or on the basis of metadata.

25. The apparatus according to claim 1, wherein the base differential mode signal generator comprises:

an inverter configured for inverting the first channel signal or the second channel signals;

an adder configured for adding an inverted channel signal to another channel signal so as to acquire the base differential mode signal or a raw differential mode signal.

26. The apparatus according to claim 1, wherein the base differential mode signal generator is configured to calculate a difference from the first channel signal and the second channel signal or between the second channel signal and the first channel signal so as to acquire the base differential mode signal, or to calculate a raw signal from which the base differential mode signal is to be derived.

27. The apparatus according to claim 1, wherein the base differential mode signal generator is configured to combine the first channel signal and the second channel signal to the extent that there is a phase difference between 45° and 135° between the first channel signal and the second channel signal.

28. The apparatus according to claim 1, wherein the base differential mode signal generator is configured for shifting a phase of the first channel signal or the second channel signal by a phase value of between 60° and 300°, and for adding or for subtracting a result of shifting the phase so as to acquire the base differential mode signal.

29. A method for generating control signals to a loudspeaker system with two sound generators, comprising:

receiving a first channel signal of a multi-channel audio signal and a second channel signal of the multi-channel audio signal;

outputting a first control signal for a first sound generator of the two sound generators, and a second control signal for a second sound generator of the two sound generators;

forming—a base differential mode signal from the first channel signal and the second channel signal;

generating a first differential mode signal and a second differential mode signal from the base differential mode signal, wherein the first differential mode signal is phase-shifted with respect to the second differential mode signal; and mixing a common mode signal with the first differential mode signal so as to acquire the first control signal, and mixing the common mode signal with the second differential mode signal so as to acquire the second control signal, wherein the generating comprises:

receiving, by a frequency filter, the base differential mode signal as one input signal or receiving, by a frequency filter, a first phase shifted signal and a second phase shifted signal derived from the base differential mode signal as several input signals and generating one or several low-pass signals from the one input signal or the several input signals received by the frequency filter; and spectrally filtering the one low-pass signal or a first low-pass signal of the several low-pass signals in a first manner so as to acquire a first filtered signal, and spectrally filtering the one low-pass signal or a second low-pass signal of the several low-pass signals in a second manner so as to acquire the second filtered signal that differs from the first filtered signal, wherein the first filtered signal is used as the first differential mode signal or the first differential mode signal is derived from the first filtered signal, and wherein the second filtered signal is used as the second differential mode signal or the second differential mode signal is derived from the second filtered signal.

30. The method according to claim 29, wherein the generating comprises generating one or several high-pass signals from the input signal or the several input signals received by the frequency filter, and wherein the generating the first differential mode signal and the second differential mode signal comprises generating the first differential mode signal by using the one high-pass signal or a first high-pass signal of the several high-pass signals, and generating the second differential mode signal by using the one high-pass signal or a second high-pass signal of the several high-pass signals.

31. The method according to claim 29, wherein the generating comprises:

phase shifting the base differential mode signal by a first phase value so as to acquire the first phase-shifted signal, and phase shifting the base differential mode signal by a second phase value so as to acquire the second phase shifted signal, wherein the second phase value differs from the first phase value;

generating the first low-pass signal from the first phase-shifted signal, and generating the second low-pass signal from the second phase-shifted signal;

wherein the first low-pass signal and the second low-pass signal are spectrally filtered, and wherein the mixing comprises determining the first control signal from the first filtered signal and the common mode signal, and determining the second control signal from the second filtered signal and the common mode signal.

32. The method according to claim 31, wherein the generating comprises generating the first low-pass signal and a first high-pass signal from the first phase-shifted signal, and generating the second low-pass signal and a second high-pass signal from the second phase-shifted signal, and wherein the mixing comprises determining the first control signal from the first high-pass signal, the first filtered signal, and a common mode signal, and determining the second control signal from the second high-pass signal, the second filtered signal, and the second common mode signal.

33. The method according to claim 29, comprising:

generating the one low-pass signal from the base differential mode signal;

wherein the spectrally filtering comprises spectrally filtering the one low-pass signal in a first manner so as to acquire the first filtered signal, and spectrally filtering the one low-pass signal in a second manner so as to acquire the second filtered signal; and wherein the generating comprises:

phase shifting the first filtered signal or a signal derived from the first filtered signal by a first phase value so as to acquire the first differential mode signal, and phase shifting the second filtered signal or a signal derived from the second filtered signal by a second phase value so as to acquire the second differential mode signal, wherein the second phase value differs from the first phase value.

34. The method according to claim 33, comprising:

generating a high-pass signal and a low-pass signal from the base differential mode signal; and combining the first filtered signal with the high-pass signal so as to acquire a first combination signal, and combining the second filtered signal with the high-pass signal so as to acquire a second combination signal, wherein the first combination signal is the signal derived from the first filtered signal, and wherein the second combination signal is the signal derived from the second filtered signal; and phase shifting the first combination signal by the first phase value so as to acquire the first differential mode signal, and phase shifting the second combination signal by the second phase value so as to acquire the second differential mode signal.

35. A non-transitory storage medium having stored thereon a computer program for performing the method according to claim 29, when the computer program is run on a computer or a processor.

* * * * *